US012809510B2

(12) United States Patent
Sato et al.

(10) Patent No.: US 12,809,510 B2
(45) Date of Patent: Nov. 24, 2026

(54) INFORMATION PROCESSING TERMINAL, INFORMATION PROCESSING METHOD, AND PROGRAM

(71) Applicant: Saturn Licensing LLC, New York, NY (US)

(72) Inventors: Tetsuya Sato, Kanagawa (JP); Shun Satou, Kanagawa (JP); Hiromichi Sugawara, Tokyo (JP); Kenji Yoneyama, Tokyo (JP); Haruki Matsuno, Tokyo (JP); Tsuyoshi Honma, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 18/283,076

(22) PCT Filed: Jan. 26, 2022

(86) PCT No.: PCT/JP2022/002778

§ 371 (c)(1),
(2) Date: Sep. 20, 2023

(87) PCT Pub. No.: WO2022/209227

PCT Pub. Date: Oct. 6, 2022

(65) Prior Publication Data

US 2024/0168619 A1 May 23, 2024

(30) Foreign Application Priority Data

Mar. 31, 2021 (JP) ................................ 2021-060579

(51) Int. Cl.

| | |
|---|---|
| ***G06F 3/048*** | (2013.01) |
| ***G06F 3/0482*** | (2013.01) |
| ***G06F 3/04847*** | (2022.01) |

(52) U.S. Cl.
CPC ........ *G06F 3/04847* (2013.01); *G06F 3/0482* (2013.01)

(58) Field of Classification Search
CPC .... G06F 3/04847; G06F 3/0482; G06F 3/165; H04N 21/4222; H04N 21/43615
See application file for complete search history.

(56) References Cited

U.S. PATENT DOCUMENTS 7,571,014 B1 * 8/2009 Lambourne ............. G06F 3/165 700/94
8,290,603 B1 * 10/2012 Lambourne ............. G06F 3/162 381/104

(Continued)

FOREIGN PATENT DOCUMENTS

EP 3425889 A1 1/2019
EP 3595277 A 1/2020

(Continued)

OTHER PUBLICATIONS

International Search Report for PCT/JP2022/002778 mailed Mar. 22, 2022. 3 pages.

*Primary Examiner* — Thanh T Vu
(74) *Attorney, Agent, or Firm* — Richard LaPeruta

(57) ABSTRACT

The present technology relates to an information processing terminal, an information processing method, and a program that make it possible to easily operate multiple devices configuring a group in a sense of feeling similar to that when a device of a single piece is operated.

The information processing terminal according to one aspect of the present technology causes a selection screen for an operation target to be displayed, the selection screen including information concerning a group including multiple devices selected from among devices registered in a server and information concerning the devices of a single piece that do not belong to the group, and requests the server to (Continued)

collectively control the devices configuring the group according to a selected operation target and control the devices of a single piece. The present technology can be applied to a system in which devices connected to a network are controlled.

20 Claims, 29 Drawing Sheets

(56) References Cited

U.S. PATENT DOCUMENTS

| | | | | |
|---|---|---|---|---|
| 2013/0082827 | A1* | 4/2013 | Cho | H04L 41/0873<br>340/12.52 |
| 2014/0178028 | A1* | 6/2014 | Park | H04L 65/1093<br>386/201 |
| 2014/0269614 | A1* | 9/2014 | Maguire | H04L 67/125<br>370/331 |
| 2016/0253145 | A1 | 9/2016 | Lee et al. | |
| 2020/0280800 | A1 | 9/2020 | Wilberding | |

FOREIGN PATENT DOCUMENTS

| | | | |
|---|---|---|---|
| JP | 2005346558 | | 12/2005 |
| JP | 2011182183 | | 9/2011 |
| JP | 2017523537 | | 8/2017 |
| JP | 6503557 | B2 | 4/2019 |
| JP | 2019067435 | A | 4/2019 |
| JP | 2019129345 | A | 8/2019 |
| JP | 2019525536 | A | 9/2019 |
| JP | 2020536274 | | 12/2020 |
| WO | WO-2015033594 | A1 | 3/2015 |
| WO | 2016103546 | | 6/2016 |
| WO | 2020003730 | A1 | 1/2020 |

* cited by examiner

INFORMATION PROCESSING TERMINAL, INFORMATION PROCESSING METHOD, AND PROGRAM

CROSS-REFERENCE TO RELATED APPLICATIONS

This application is a national phase entry under 35 U.S.C. § 371 of International Application No. PCT/JP2022/002778 filed Jan. 26, 2022, which claims the priority from Japanese Patent Application No. 2021-060579 filed in the Japanese Patent Office on Mar. 31, 2021, the entire contents of which are hereby incorporated by reference.

TECHNICAL FIELD

The present technology relates to an information processing terminal, an information processing method, and a program, and particularly to an information processing terminal, an information processing method, and a program that make it possible to easily operate multiple devices configuring a group in a sense of feeling similar to that when a single piece of device is operated.

BACKGROUND ART

In recent years, what is generally called a smart device that is a device capable of being operated from a portable terminal such as a smartphone has come into widespread use. By performing operation on a screen of an application installed in the smartphone, a user can control, for example, the behavior of a device placed in the house from the outside.

There has also been proposed a technology in which, in a case where multiple speakers are installed, the speakers are linked to each other.

CITATION LIST

Patent Literature

[PTL 1]
Japanese Patent No. 6503557
[PTL 2]
PCT Patent Publication No. WO2020/003730

SUMMARY

Technical Problem

In a case where multiple devices are to be caused to behave in a linked relation to each other, there is demanded a UI (User Interface) that allows intuitive selection of the device that is to be an operation target.

Since the display becomes complicated, this is especially important in a case where there are multiple groups of devices that behave in a linked relation to each other or in a case where both a group of devices that behave in a linked relation to each other and a device that behaves as a single piece exist in a mixed manner.

The present technology has been made in view of such a situation as described above and makes it possible for multiple devices configuring a group to be easily operated in a sense of feeling similar to that when a single piece of device is operated.

Solution to Problem

An information processing terminal according to one aspect of the present technology includes a display controlling section that causes a selection screen for an operation target to be displayed, the selection screen including information concerning a group including multiple devices selected from among devices registered in a server and information concerning one of the devices as a single piece that does not belong to the group, and a control section that requests the server to collectively control the devices configuring the group and requests the server to control one of the devices as a single piece, according to a selected operation target.

In the one aspect of the present technology, there is displayed a selection screen for an operation target which includes information concerning a group including in a server and information concerning one of the devices as a single piece that does not belong to the group. Further, the server is requested to collectively control the devices configuring the group and control one of the devices as a single piece, according to a selected operation target.

DESCRIPTION OF EMBODIMENT

Figure 1:
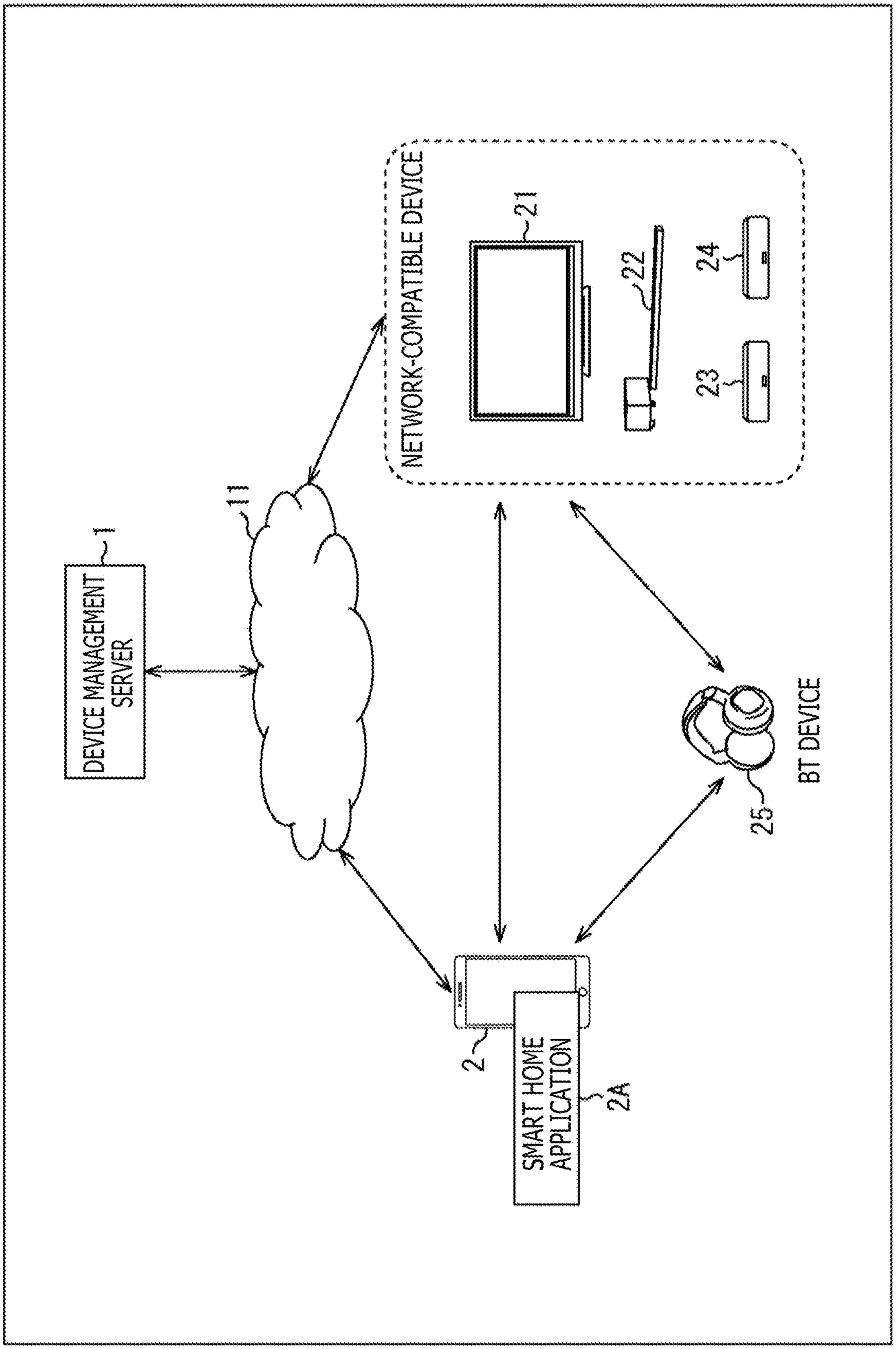
FIG. 1 is a diagram depicting an example of a configuration of an information processing system according to an embodiment of the present technology.

In the following, a mode for carrying out the present technology is described. The description is given in the following order.

1. Information processing system
2. Group setting function
3. Operation of device
4. Use case of smart home application
5. Automatic management of group
6. Configuration of devices
7. Modification <<Information Processing System>>

FIG. 1 is a diagram depicting an example of a configuration of an information processing system according to an embodiment of the present technology.

The information processing system of FIG. 1 is a system called a smart home system that is used to mainly operate a device in the house with use of an information processing terminal such as a smartphone.

Devices that become an operation target include various kinds of AV equipment such as a TV (television receiver), a recorder, a soundbar, or a speaker and various home appliances such as a refrigerator, a microwave oven, a washing machine, an air conditioner, a cleaner, or a lighting equipment. Not only AV equipment and home appliances but also various devices in the house such as a home robot and an IoT (Internet of Things) device become devices of an operation target. Devices of an operation target also include equipment that incorporates a voice agent function that allows operation by voice.

As depicted in FIG. 1, operation of a device is implemented by a device management server 1 that is a server on a network 11 such as the Internet. The device management server 1 is an information processing apparatus that is managed by a business operator who provides an information processing system.

The device management server 1 may include a single computer or may include multiple computers. Communication between the device management server 1 and a smartphone 2 that is operated by a user and communication between the device management server 1 and a device that becomes an operation target are performed through the network 11.

In the example of FIG. 1, the smartphone 2 is depicted as an information processing terminal used for operating a device. The smartphone 2 has installed therein a smart home application 2A that is an application program that runs on a predetermined OS.

In a case where the user is to operate a device in the house by using the information processing system of FIG. 1, the user installs the smart home application 2A into his/her own smartphone 2. The smart home application 2A is provided by a business operator who provides the information processing system. The user uses a screen displayed by the smart home application 2A, to perform various kinds of operation such as operation of a device.

Further, in the example of FIG. 1, as devices in the house, a TV 21, a soundbar 22, speakers 23 and 24, and a headphone 25 are depicted. The devices mentioned above are provided, for example, in the house of the user of the smartphone 2. The user can perform operation of the device not only in his/her own house but also from the outside.

As indicated by a broken line frame, the TV 21, the soundbar 22, and the speakers 23 and 24 are network-compatible devices. The TV 21, the soundbar 22, and the speakers 23 and 24 can individually perform communication with the device management server 1 via a LAN in the house and the network 11. In the house, for example, a network by a wireless LAN is constructed.

Further, the TV 21, the soundbar 22, and the speakers 23 and 24 can perform communication with the smartphone 2 via the LAN in the house and so forth. In a case where the user is not at home, communication between the smartphone 2 and the network-compatible devices is performed through the network 11.

Meanwhile, the headphone 25 is a device (BT device) that is compatible with wireless communication by Bluetooth (registered trademark) but not network-compatible. The headphone 25 performs communication with the smartphone 2 or a network-compatible device through wireless communication by Bluetooth. Alternatively, a device compatible with wireless communication of a standard different from Bluetooth may be provided.

Control of a device by the device management server 1 is performed, in a case where the device of the operation target is a network-compatible device, in accordance with a command transmitted directly thereto from the device management server 1. On the other hand, in a case where the device of the operation target is a BT device, control of the device by the device management server 1 is performed in accordance with a command transmitted thereto via the smartphone 2 or a network-compatible device. Operation of a BT device is performed, for example, by a parent device that is the smartphone 2 or a network-compatible device that can perform communication directly with the device management server 1.

In the information processing system of FIG. 1, a group includes multiple devices, and operation targeting the group can be performed. Naturally, it is also possible to perform operation targeting a single piece of device. A group sometimes includes only a network-compatible device or network-compatible devices and sometimes includes a network-compatible device or network-compatible devices and a BT device or BT devices. A group may otherwise include only a BT device or BT devices.

On the screen of the smart home application 2A, information representative of a group including multiple devices and information representative of each device as a single piece are displayed in a mixed manner. The user can collectively operate multiple devices configuring a group, for example, by selecting a certain group as an operation target and selecting contents of operation. In a case where a group is selected to be an operation target, information that serves as a GUI such as buttons to be used for operation of a group is displayed on the screen of the smart home application 2A.

Figure 2:
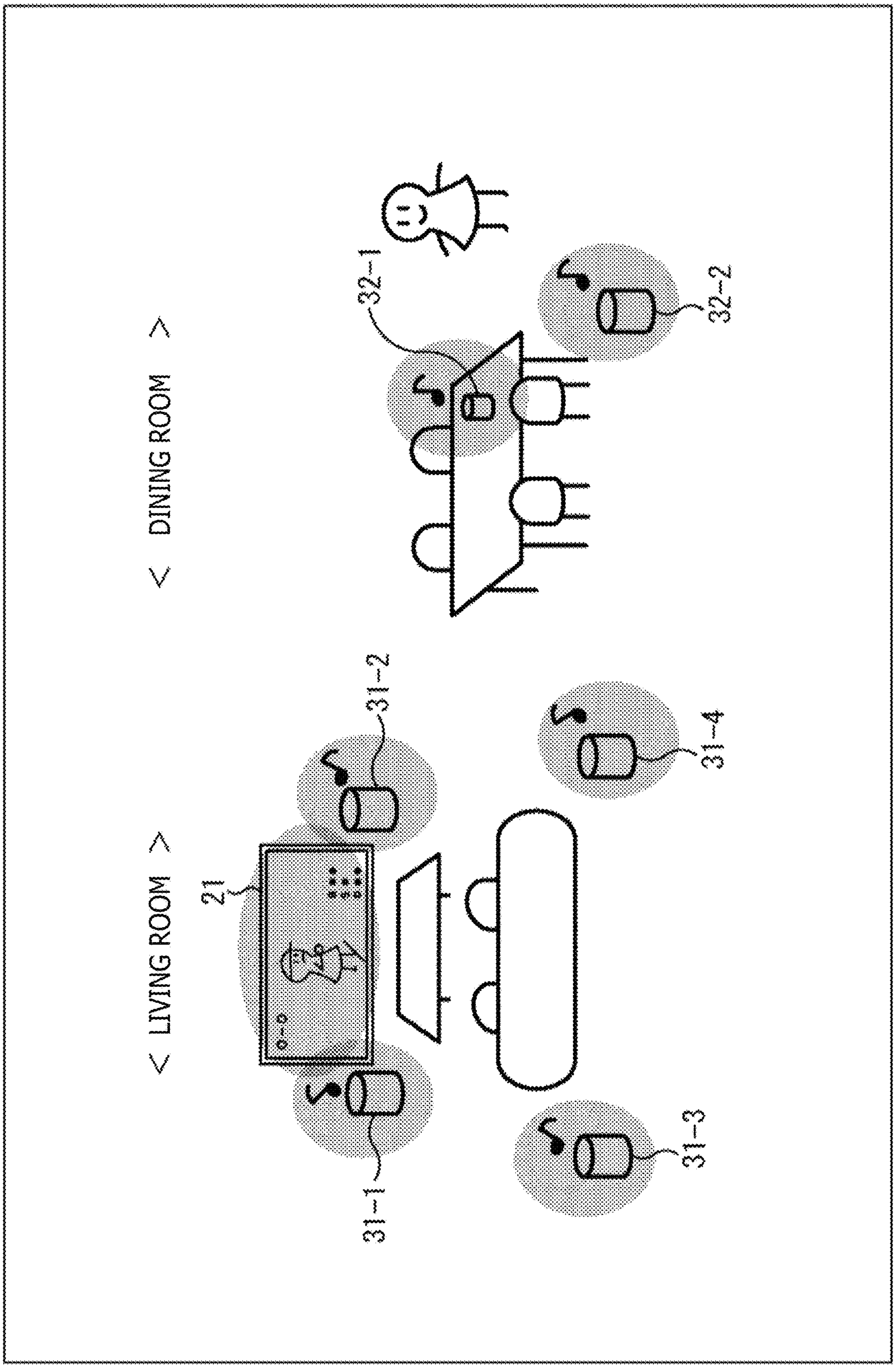
FIG. 2 is a view depicting an example of operation of a group.

Consequently, it is possible for the user to cause sound of content being viewed on the TV 21 in the living room to be outputted from speakers located at various places in the own home, as illustrated FIG. 2, for example. In the example of FIG. 2, sound of content is transmitted from the TV 21 to and outputted from speakers 31-1 to 31-4 in the living room and speakers 32-1 and 32-2 in the dining room.

Outputting of sound depicted in FIG. 2 is implemented by operation of selecting the group configured from the TV 21, the speakers 31-1 to 31-4, and the speakers 32-1 and 32-2 as an operation target such that sound of content is outputted from the individual speakers.

In such a manner, by using the smart home application 2A, the user can easily operate multiple devices configuring a group with a sense of feeling same as that when a single piece of device is operated.

Further, the user can easily perform creation of a group including any devices or changing devices configuring a group by using the smart home application 2A. The change of devices configuring a group includes addition and deletion of a device. A setting function of a group is also provided in the smart home application 2A.

<<Group Setting Function>>

Here, a group setting function of the smart home application 2A is described.

<Creation of Group>

A series of processes at the time of creation of a group is described with reference to a flow chart of FIG. 3.

Here, description is given of a process in a case where the devices configuring a group are the TV 21 and the soundbar 22 that are network-compatible devices. The TV 21 and the soundbar 22 are connected to a LAN in the house together with the smartphone 2. Although a process performed by the TV 21 is described as the process of a device, a process same as the process performed by the TV 21 is performed by the soundbar 22. This similarly applies to FIG. 8 and so forth described later.

Figure 3:
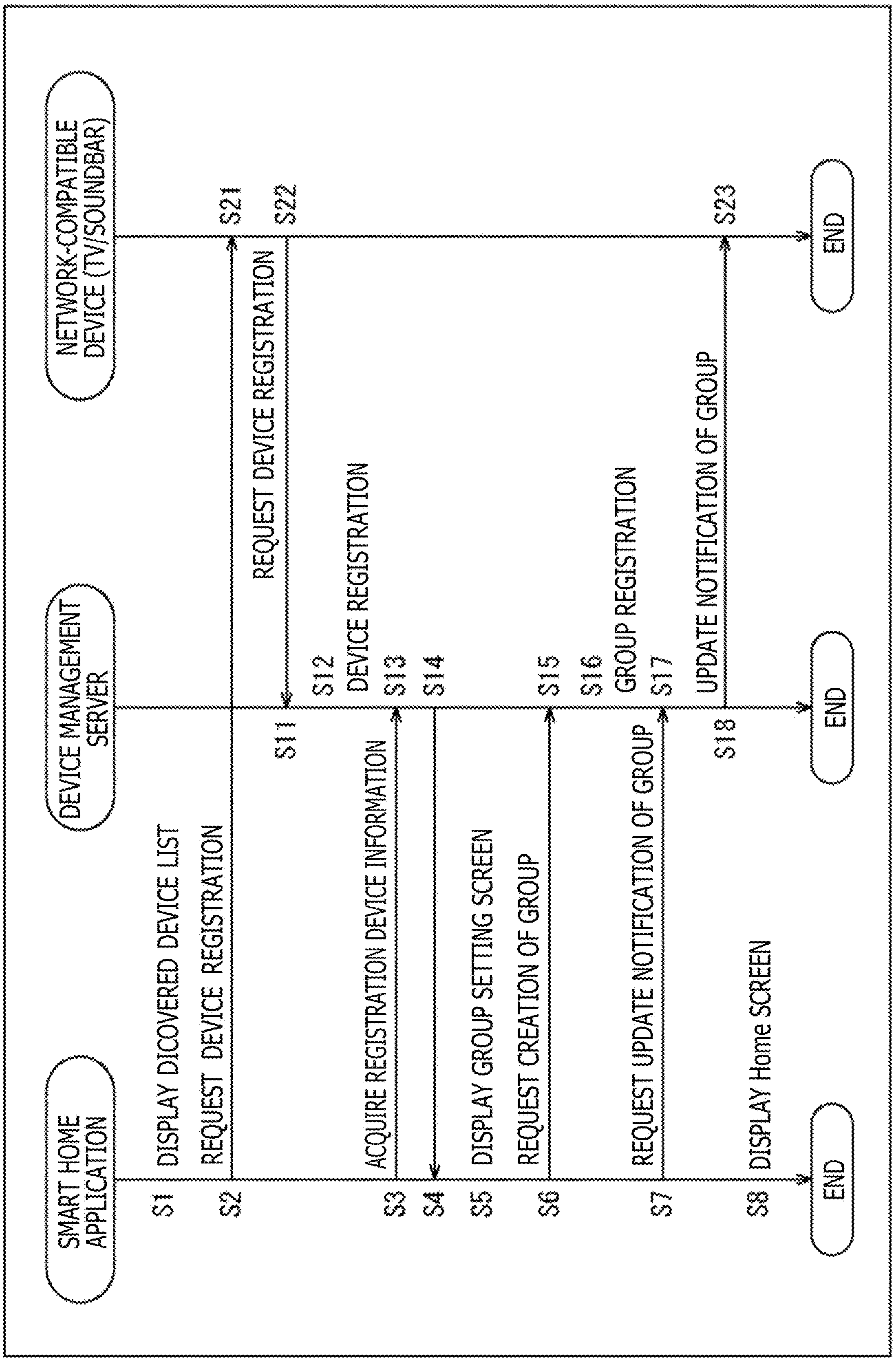
FIG. 3 is a flow chart illustrating a series of processes performed at the time of creation of a group.

The process of FIG. 3 is started when the smart home application 2A starts up in the smartphone 2 and an instruction for search for a device is issued by the user.

In step S1, the smart home application 2A causes a discovered device list to be displayed. The discovered device list is a list of devices discovered by the search.

Figure 4:
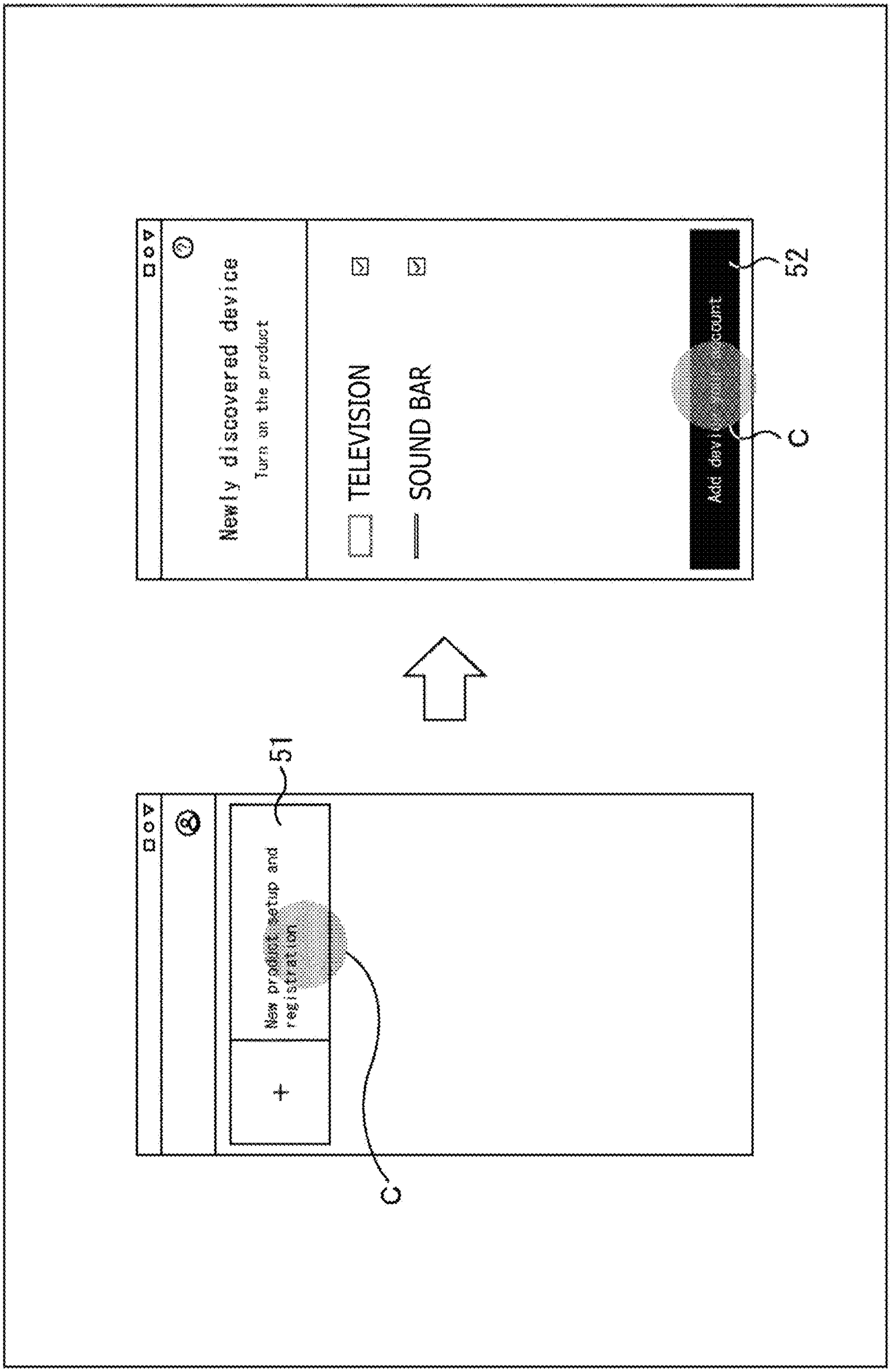
FIG. 4 is a view depicting an example of screen display performed at the time of creation of a group.

FIG. 4 is a view depicting an example of screen display at the time of group creation.

For example, in a case where it is selected that a group is to be newly created, a search button 51 that is operated when a search for a device is to be performed is displayed on the screen of the smart home application 2A as depicted on the left side in FIG. 4. A colored circle C depicted on the left side in FIG. 4 represents that operation of depressing the button is performed by the user.

In a case where the search button 51 is operated, for example, a search for a device connected to the same LAN is performed, and such a discovered device list as depicted on the right side in FIG. 4 is displayed. In the example of FIG. 4, the TV 21 and the soundbar 22 are displayed in the discovered device list. In the discovered device list, for example, icons and device names representative of the devices discovered by the search are displayed.

The user can select a device to be registered from among the devices displayed in the discovered device list. In a case where a registration button 52 is operated in a state in which the TV 21 and the soundbar 22 are selected by check boxes of them being checked, device registration of the TV 21 and the soundbar 22 is performed.

The device registration is a process of registering information concerning a device in association with an account of a user. From among the devices for which device registration has been performed, the user can select a device that is to configure a group or select a device to be made an operation target. The user signs in to a service provided by the device management server 1 by inputting, before device registration, his/her own account to the screen of the smart home application 2A or by similar means.

In step S2 of FIG. 3, the smart home application 2A requests device registration to the device whose registration is selected. At this time, information relating to signing in and information relating to setting of the LAN in the house are transmitted suitably to the device together with information representing that device registration is requested.

In step S21, the TV 21 receives the information transmitted from the smart home application 2A.

In step S22, the TV 21 accesses the device management server 1, performs such a process as signing in, in reference to the information transmitted thereto from the smart home application 2A, and then requests device registration. From the TV 21 to the device management server 1, Capability information including information concerning functions, specifications, and so forth of the TV 21 is transmitted.

In step S11, the device management server 1 receives the information transmitted thereto from the TV 21.

In step S12, the device management server 1 manages the device information, the device state information, the Capability information, and so forth transmitted thereto from the TV 21, in association with the account information, to perform device registration. The device information is information including a device ID and so forth. The device state information is information representative of a state of the device.

In step S3, the smart home application 2A accesses the device management server 1 to acquire registration device information. The registration device information is information relating to the device for which the device registration has been performed.

In step S13, the device management server 1 accepts the access by the smart home application 2A.

In step S14, the device management server 1 transmits the registration device information to the smart home application 2A.

In step S4, the smart home application 2A receives the registration device information transmitted thereto from the device management server 1.

In a case where a group already created exists, a group list is suitably acquired from the device management server 1 together with the registration device information. The group list is a list of groups created already.

In step S5, the smart home application 2A displays a group setting screen. The group setting screen is a screen used for creation of a group, change of devices configuring a group, and so forth.

Figure 5:
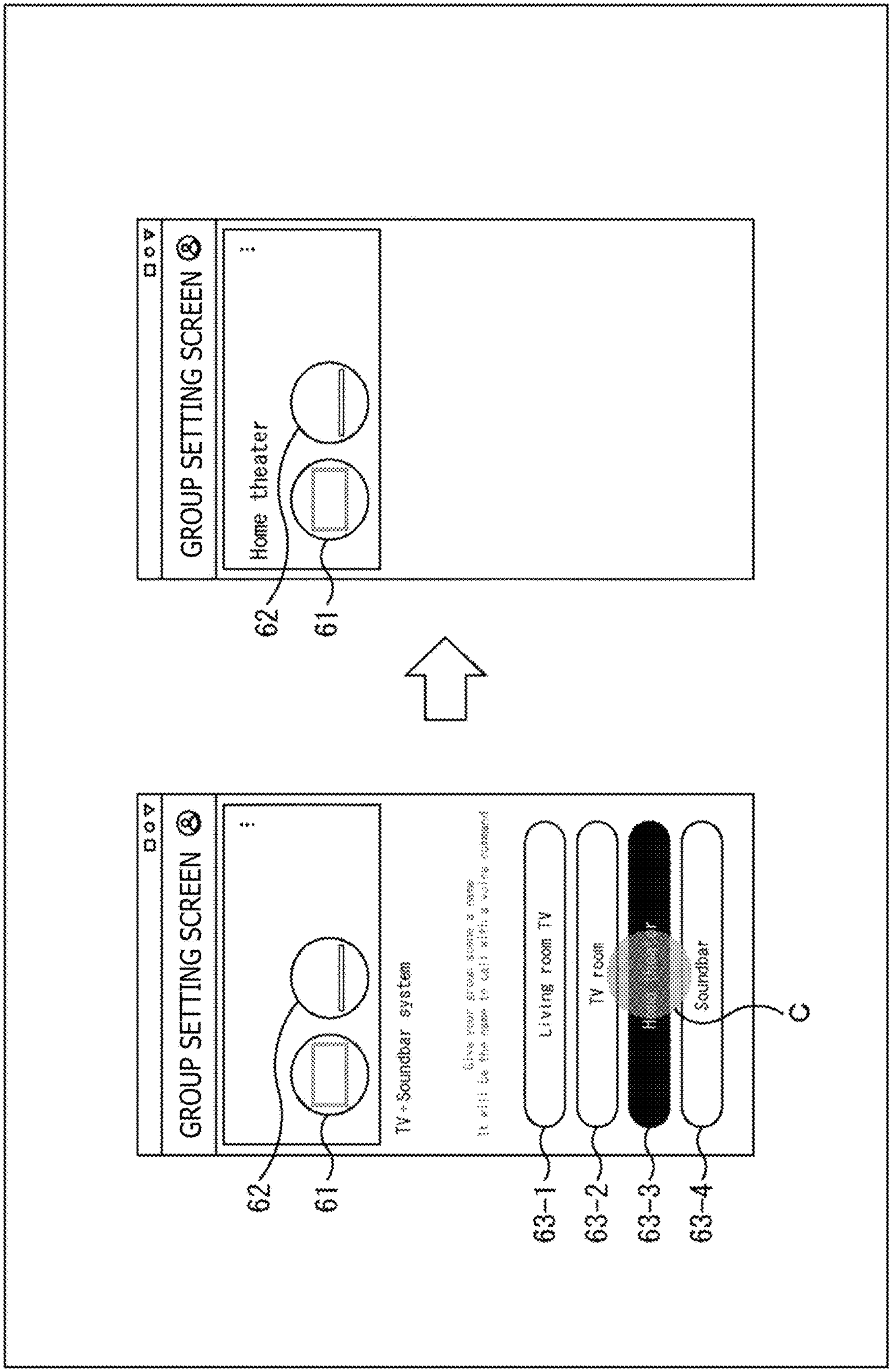
FIG. 5 is a view depicting an example of display of a group setting screen.

FIG. 5 is a view depicting an example of display of a group setting screen.

As depicted on the left side in FIG. 5, icons 61 and 62 representative of the TV 21 and the soundbar 22 that are devices for which device registration is completed are displayed at an upper portion of the group setting screen.

Below the icons 61 and 62, selection buttons 63-1 to 63-4 that are used for selection of a name to be set for a group (group name) are displayed. In the example of FIG. 5, the selection buttons 63-1 to 63-4 are buttons that are operated when any of group names of "Living room TV," "TV room," "Home theater," and "Soundbar" is selected, respectively. The group names of "Living room TV," "TV room," "Home theater," and "Soundbar" are names, for example, set in advance. It is also possible for the user to set any name as a group name.

For example, in a case where the selection button 63-3 is operated, the group name of "Home theater" is set for the group including the TV 21 and the soundbar 22 as depicted on the right side in FIG. 5.

After the group name is set, the smart home application 2A transmits information representing a request for creation of a group to the device management server 1 in step S6 of FIG. 3.

In step S15, the device management server 1 accepts the group creation request from the smart home application 2A.

In step S16, the device management server 1 manages the group ID and so forth in association with the account information to perform group registration.

In step S7, the smart home application 2A requests a group update notification to the device management server 1. The group update notification is a process of notifying, in a case where devices configuring a group, settings of a behavior of a group, or the like are updated, the devices configuring the group of information representative of contents of the update.

In step S17, the device management server 1 accepts the request for the group update notification from the smart home application 2A.

In step S18, the device management server 1 transmits the group update notification to the TV 21 and the soundbar 22 that are devices configuring the group newly created.

In step S23, the TV 21 receives the group update notification transmitted thereto from the device management server 1. By the group update notification, the information representing that, for example, the TV 21 and the soundbar 22 are set as devices configuring the newly created group is transmitted to the TV 21 and the soundbar 22.

The group update notification may be performed not in response to the request from the smart home application 2A but may be performed actively by the device management server 1 after the group registration (step S16).

The processes described above are repeated, for example, to create multiple groups.

When the creation of the group is ended, in step S8, the smart home application 2A displays a Home screen including the information concerning the created group. The series of processes for creating a group is ended therewith.

Figure 6:
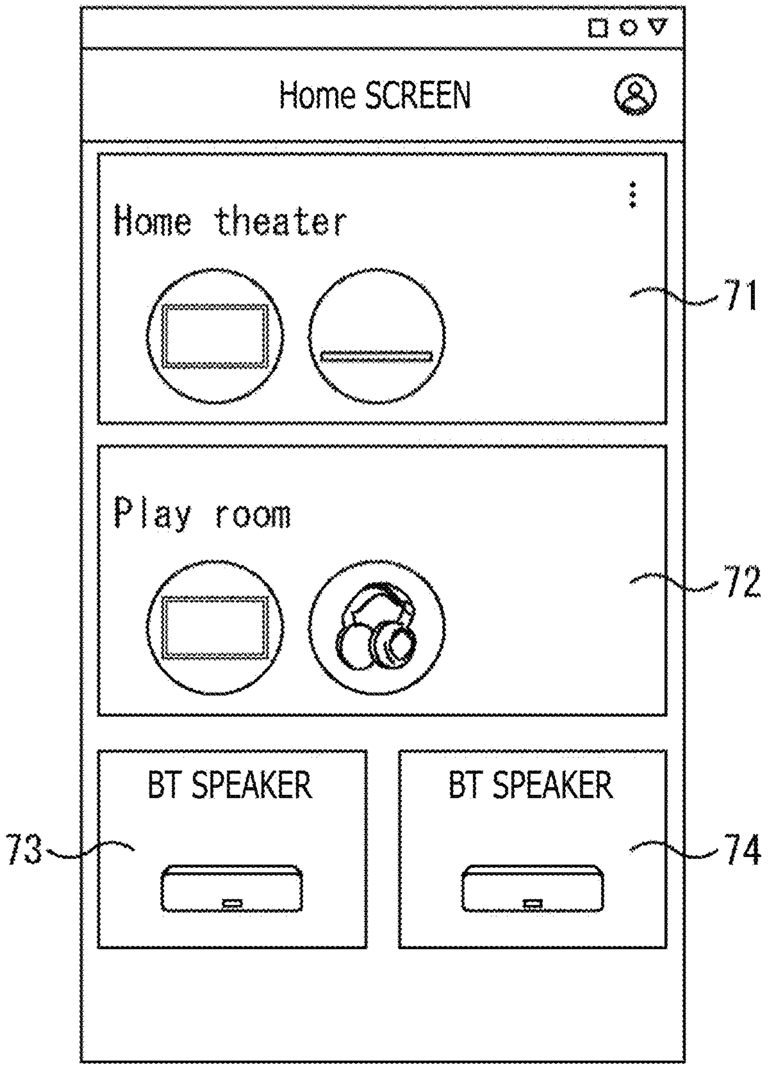
FIG. 6 is a view depicting an example of display of a Home screen.

FIG. 6 is a view depicting an example of display of the Home screen.

As depicted in FIG. 6, the Home screen displays buttons that are operated when a group is to be selected and buttons that are operated when a device as a single piece is to be selected.

A group selection button 71 of a horizontally elongated rectangle is a button that is operated when the group of "Home theater" is to be selected. A group selection button 72 is a button that is operated when the group of "Play room" is to be selected. On each of the buttons, a group name and icons representative of devices configuring the group are displayed.

In the example of FIG. 6, the group of "Home theater" is a group including a TV and a soundbar (TV 21 and soundbar 22), and the group of "Play room" is a group including a TV and a headphone (TV different from the TV 21 and the headphone 25).

The number of groups to which one device can belong may be only one or a plural number. In the latter case, one device can be set, as a device configuring a group, in an overlapping relation for multiple groups.

A device selection button 73 and another device selection button 74 are displayed below the group selection button 72. The device selection button 73 is a button that is operated when the BT speaker 23 is to be selected as a single piece of device. The device selection button 74 is a button that is operated when the BT speaker 24 is to be selected as a single piece of device.

In such a manner, information concerning groups and information concerning each device as a single piece are displayed on the Home screen. The user can select and operate a group with a sense of feeling same as that in selecting a single piece of device.

For example, in a case where the group selection button 71 is operated, a button that is used to operate the group of "Home theater" and so forth are displayed on the Home screen. Further, in a case where the device selection button 73 is operated, a button that is used to operate the BT speaker 23 and so forth are displayed. Display of the operation screen is described later.

Figure 7:
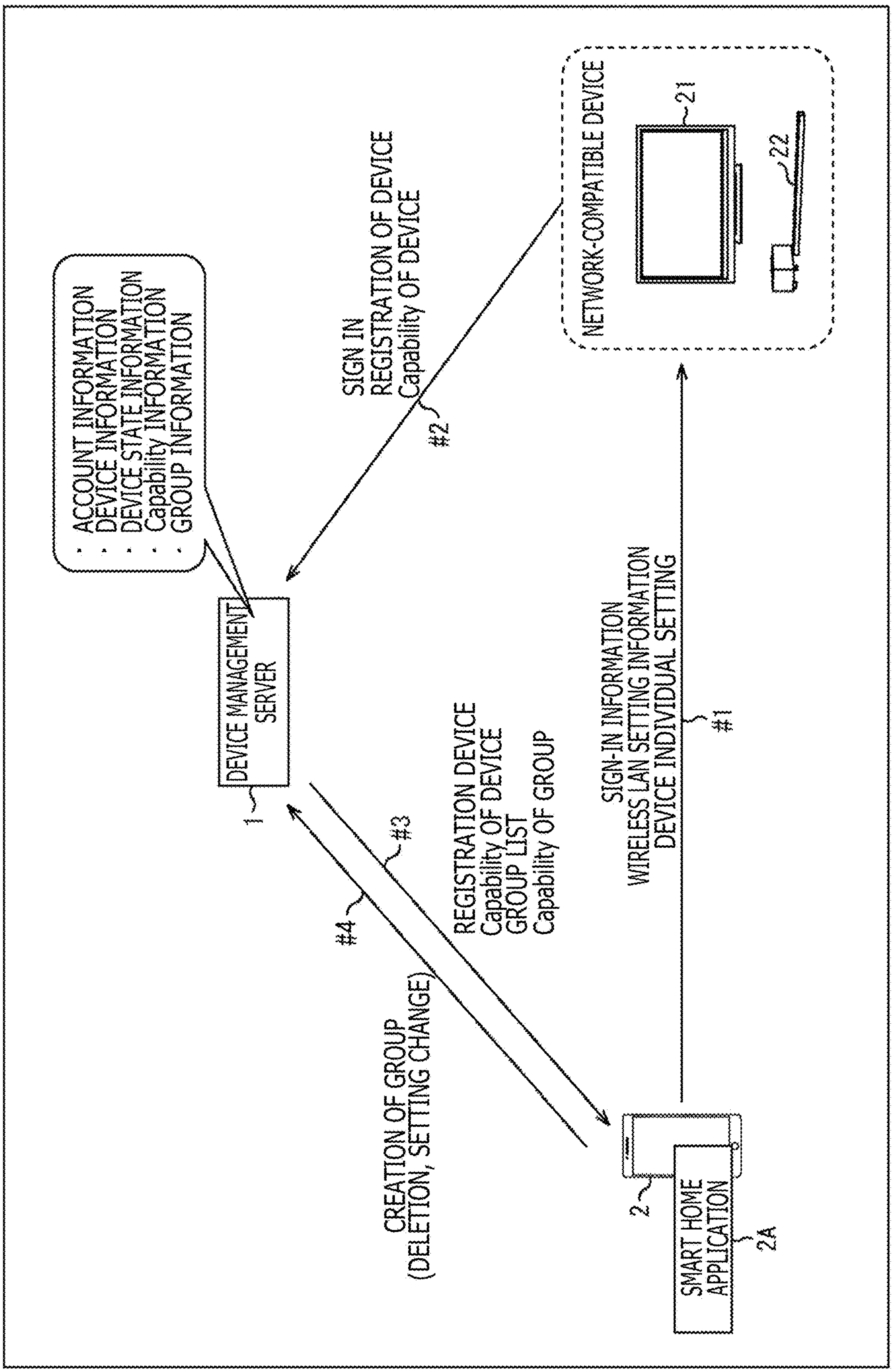
FIG. 7 is a view depicting an example of information to be transmitted and received at the time of creation of a group.

FIG. 7 is a view depicting an example of information to be transmitted and received at the time of creation of a group.

As indicated by an arrow mark #1, sign-in information, wireless LAN setting information, and information relating to setting of individual devices are transmitted from the smart home application 2A to devices for which device registration is to be performed (step S2 of FIG. 3). The information relating to the individual settings includes information relating to setting of the individual devices such as setting of time, setting of calibration, setting of audio for outputting, and so forth.

As indicated by an arrow mark #2, signing in based on the sign-in information is performed on the device management server 1 by a device that requests device registration. Further, from the device that requests device registration to the device management server 1, information relating to Capability of the device is transmitted together with the information for requesting registration of the device (step S22 of FIG. 3).

As indicated by an arrow mark #3, registration device information and information relating to Capability of the device are transmitted from the device management server 1 to the smart home application 2A (step S14 of FIG. 3). Further, in a case where there is a group already created, information relating to the group list and information relating to Capability of the groups are transmitted from the device management server 1 to the smart home application 2A. Capability of a group is set according to the devices configuring the group, for example, by the device management server 1.

As indicated by an arrow mark #4, information representing a request for creation of a group is transmitted from the smart home application 2A to the device management server 1 (step S6 of FIG. 3). Information representing a request for addition/deletion of a device configuring a group, information representing a request for change of the setting of a behavior of the group, and so forth are also transmitted similarly from the smart home application 2A to the device management server 1.

Since transmission and reception of such information as described above are performed, the device information, the device state information, the Capability information, and the group information are registered in association with the account information into the device management server 1 as indicated in a balloon. The group information is information including, for example, IDs of the devices configuring the group.

Every time creation of a group, addition/deletion of a device configuring a group, setting change of a behavior of a group, or the like is performed, the individual information registered in association with the account information is updated.

<Addition of Device>

A series of processes when a device is added is described with reference to a flow chart of FIG. 8. Overlapping description with the description given hereinabove is omitted suitably.

Here, a process in a case where a device is added to the group including the TV 21 and the soundbar 22 is described. It is assumed that the device to be added (additional device) is a network-compatible device. Further, it is assumed that the additional device is a device for which device registration is completed.

Figure 8:
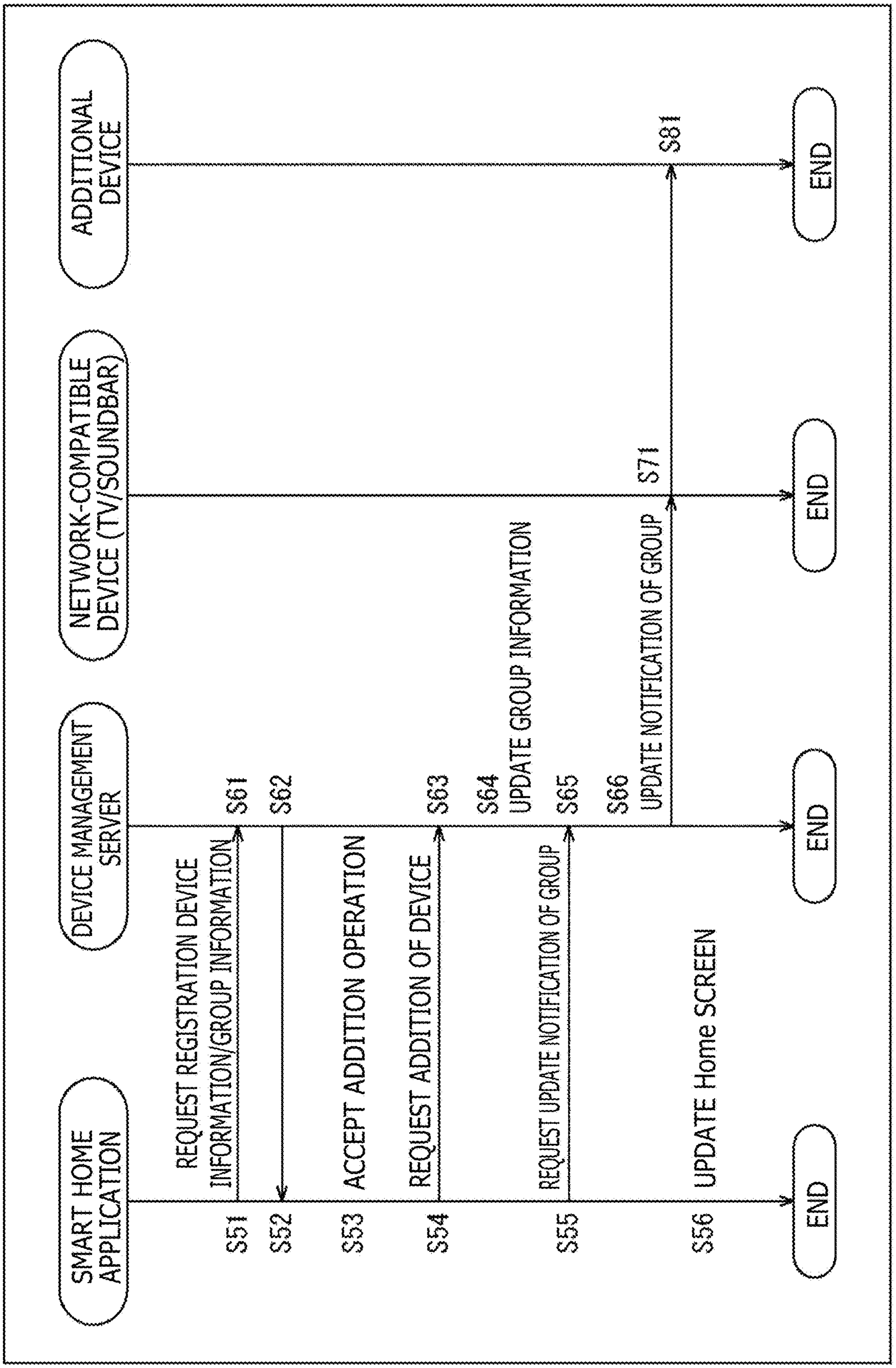
FIG. 8 is a flow chart illustrating a series of processes performed at the time of addition of a device.

The process of FIG. 8 is started when an instruction to add a device is issued by the user in a state in which a group is selected on the Home screen. Details of the screen display are described later.

In step S51, the smart home application 2A requests registration device information and group information to the device management server 1.

In step S61, the device management server 1 accepts the request from the smart home application 2A.

In step S62, the device management server 1 transmits the registration device information and the group information to the smart home application 2A.

In step S52, the smart home application 2A receives the registration device information and the group information transmitted thereto from the device management server 1.

In step S53, the smart home application 2A accepts operation performed by the user for selecting an additional device. The additional device is selected, for example, from among devices that do not belong to any group.

After an additional device is selected, in step S54, the smart home application 2A transmits information representing a request for addition of a device to the device management server 1. The information representing a request for addition of a device includes information concerning a group ID, an ID of the additional device, and so forth.

In step S63, the device management server 1 accepts the request from the smart home application 2A.

In step S64, the device management server 1 updates the group information managed that it manages, in association with the account information. The update of the group information is performed such that, for example, the ID of the additional device is added as an ID of a device that configures the group.

In step S55, the smart home application 2A requests an update notification of the group to the device management server 1. As described hereinabove, the group update notification may be performed not in response to a request from the smart home application 2A but may be performed actively by the device management server 1.

In step S65, the device management server 1 accepts the request for group update notification from the smart home application 2A.

In step S66, the device management server 1 transmits the group update notification to the TV 21 and the soundbar 22 that are devices configuring the group and transmits the group update notification to the newly added device.

In step S71, the TV 21 receives the group update notification transmitted thereto from the device management server 1. By the group update notification, the TV 21 and the soundbar 22 are notified, for example, of the information representing that a device has been newly added.

In step S81, the additional device receives the group update notification transmitted thereto from the device management server 1.

When the addition of the device is ended, the smart home application 2A causes the Home screen including the information concerning the group obtained after the device addition to be displayed in step S56. The series of processes for adding a device is ended therewith.

Now, another series of processes at the time of addition of a device is described with reference to a flow chart of FIG. 9.

Figure 9:
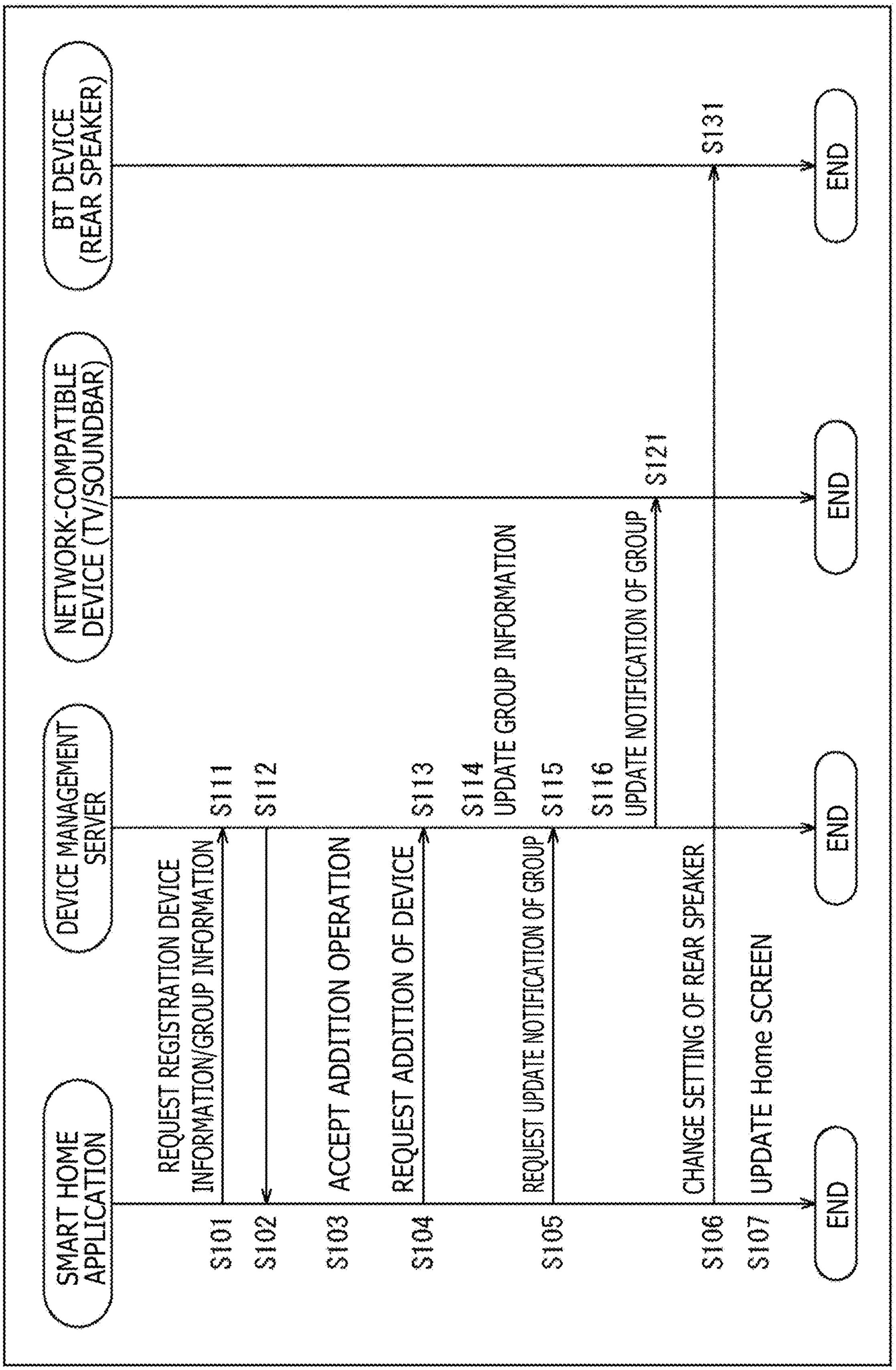
FIG. 9 is a flow chart illustrating another series of processes performed upon addition of a device.

The process depicted in FIG. 9 is a process in a case where the additional device is a rear speaker as a BT device. Further, it is assumed that the rear speaker that becomes the additional device is a device for which device registration is completed. Device registration of the rear speaker is performed through a smartphone 2 (smart home application 2A) that behaves as a parent device of the rear speaker or a network-compatible device.

The process depicted in FIG. 9 is a process basically similar to the process described hereinabove with reference to FIG. 8 except that update notification of a group from the device management server 1 to the additional device is not performed. Description overlapping with the foregoing description is omitted suitably.

Processes of the smart home application 2A in steps S101 to S105 are processes similar to the processes in steps S51 to S55 of FIG. 8. In step S103, operation for adding the rear speaker that does not belong to any group to the group is accepted. As described hereinabove, the group update notification may be performed not in response to a request from the smart home application 2A but may be performed actively by the device management server 1.

Processes in steps S111 to S116 are processes similar to the processes in steps S61 to S66 of FIG. 8. In step S114, the group information is updated such that the rear speaker is added to the group.

The group update notification transmitted from the device management server 1 in step S116 is received by the TV 21 in step S121.

In step S106, the smart home application 2A transmits information for instructing change of the setting to the rear speaker.

In step S131, the rear speaker receives the information transmitted thereto from the smart home application 2A and changes the setting. For example, the setting of the rear speaker is changed such that it behaves in an interlocking relation with the TV 21 and the soundbar 22 that belong to the same group.

In step S107, the smart home application 2A displays the Home screen including the information concerning the group obtained after the addition of the rear speaker. The series of processes for adding the BT device is ended therewith.

Figure 10:
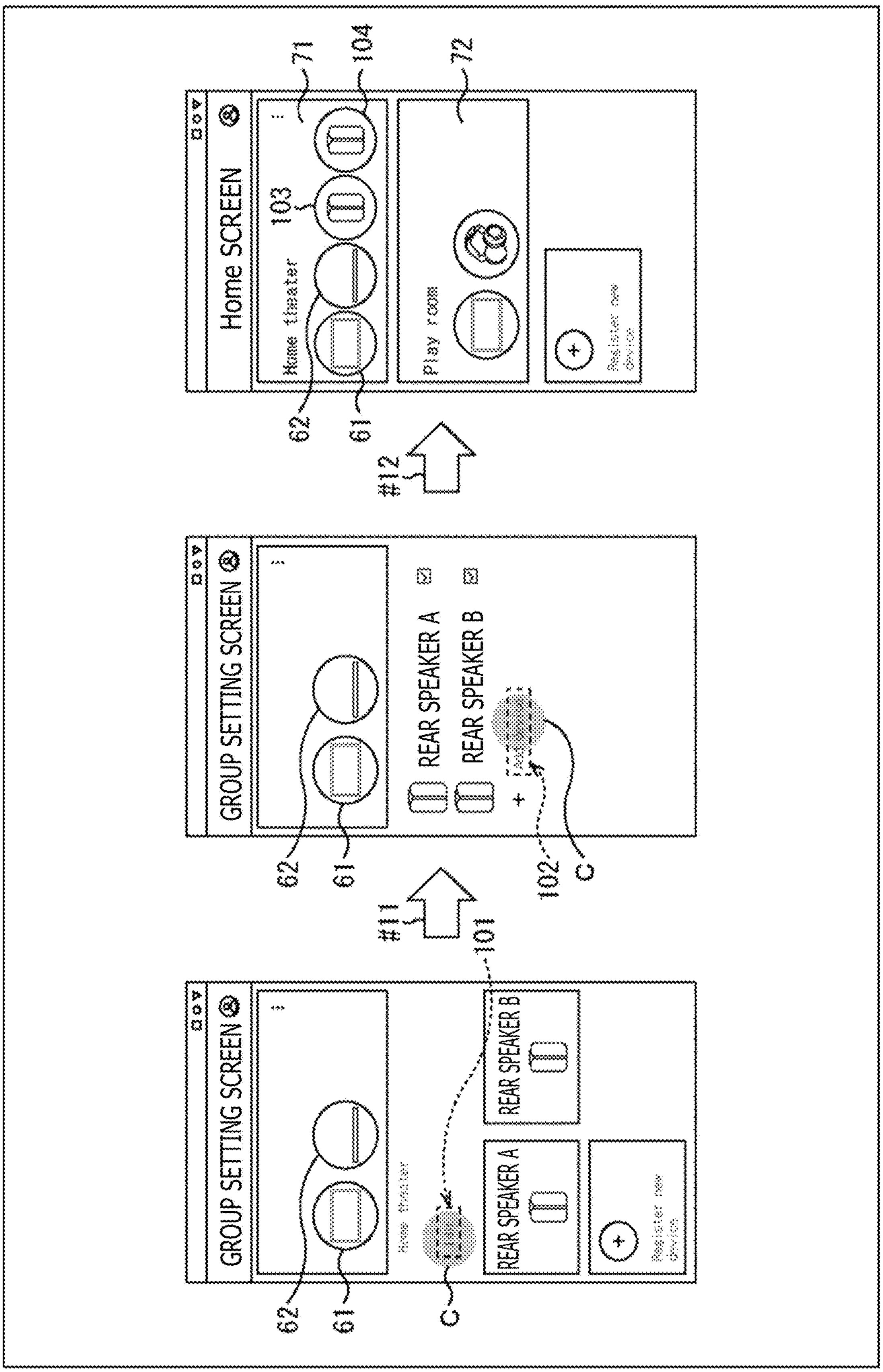
FIG. 10 is a view depicting an example of screen display performed at the time of addition of a device.

FIG. 10 is a view depicting an example of screen display at the time of addition of a device.

For example, in a case where the group of "Home theater" is selected on the Home screen, an edit button 101 is displayed as illustrated on the left side in FIG. 10. The edit button 101 is a button that is operated when addition/deletion of a device configuring the group is to be performed. In the example of FIG. 10, the devices that belong to the group of “Home theater” are the TV 21 and the soundbar 22.

Below the edit button 101, device names and icons of a rear speaker A and a rear speaker B are displayed as information concerning each device as a single piece that does not belong to any group. The rear speaker A and the rear speaker B are, for example, BT devices for which device registration is completed already.

In a case where the edit button 101 is operated, a selection screen of a device to be added to the group of “Home theater” is displayed as indicated at the destination of an arrow mark #11. The user can select a device to be added from among the devices displayed on the selection screen. In a case where an addition button 102 is operated in a state in which the rear speaker A and the rear speaker B are selected by check boxes being checked or by similar means, addition of the rear speaker A and the rear speaker B is performed.

As described hereinabove as processes in steps S103 and S104 of FIG. 9 (steps S53 and S54 of FIG. 8), the operation performed by the user for adding the rear speaker A and the rear speaker B is accepted by the smart home application 2A, and addition of the devices is requested to the device management server 1. In the device management server 1, the rear speaker A and the rear speaker B are added to the group of “Home theater” in response to the request from the smart home application 2A.

In a case where addition of the rear speaker A and the rear speaker B is performed, the addition of the rear speaker A and the rear speaker B is reflected on the display of the Home screen as indicated at the destination of an arrow mark #12 in FIG. 10. On the Home screen depicted on the right side in FIG. 10, an icon 103 representative of the rear speaker A and an icon 104 representative of the rear speaker B are displayed on the group selection button 71 in addition to the icons 61 and 62.

By operating the group selection button 71, the user can select and operate the group of “Home theater” to which the rear speaker A and the rear speaker B are added.

In such a manner, by selecting a group already created and selecting a device, the user can add the device that does not belong to any group easily as a device that configures the selected group.

Deletion of a device is performed in a similar manner. Deletion of a device is performed by selecting a group already created from within the Home screen or the like and selecting a device to be deleted. When a group already created is selected, a list of devices that configure the group is displayed, and a device to be deleted can be selected from among the devices.

<<Operation of Device>>

<Display of Operation Screen>

Figure 11:
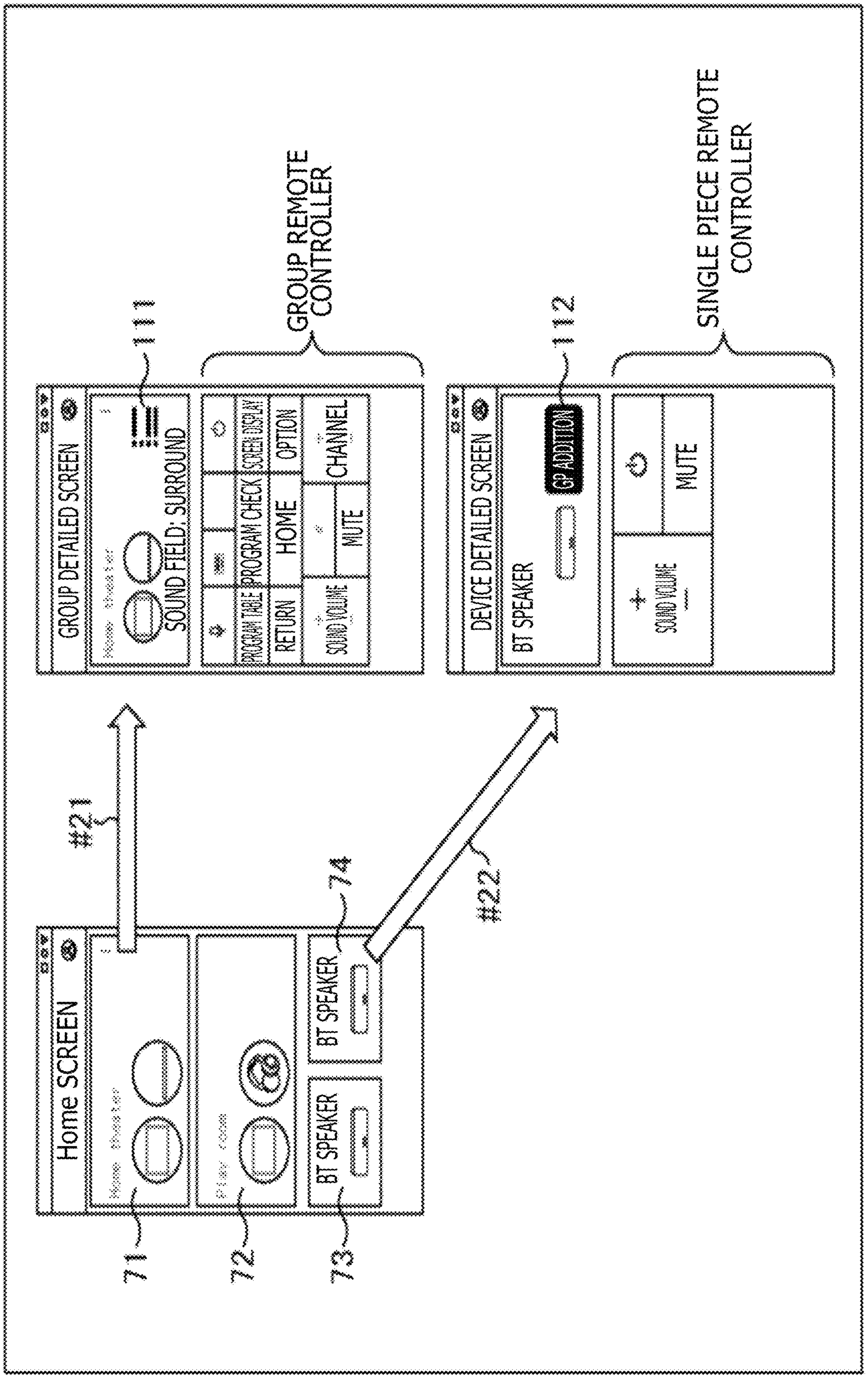
FIG. 11 is a view depicting an example of display of an operation screen.

FIG. 11 is a view depicting an example of display of an operation screen.

The Home screen depicted on the left side in FIG. 11 is a screen same as the screen described hereinabove with reference to FIG. 6. On the Home screen, group selection buttons 71 and 72 that are operated when a group is to be selected and device selection buttons 73 and 74 that are operated when a device as a single piece is to be selected are displayed.

For example, in a case where the group selection button 71 is operated, a group detailed screen is displayed as indicated at the destination of an arrow mark #21. At an upper portion of the group detailed screen, detailed information concerning the group of “Home theater” is displayed. As the detailed information, icons representative of devices configuring the group, an option button 111, information representative of contents of setting of a behavior of the group, and so forth are displayed. In the example of FIG. 11, as the information representative of contents of setting of a behavior of the group, information representing that the setting of the sound field is “surround” is displayed.

In a case where the option button 111 is operated, a list of operation targeting a group is displayed. Operating the option button 111 allows operation, for example, for change of a group name, change of setting of a sound field, transition to a different screen such as a device detailed screen, and so forth to be performed.

A group remote controller (group remote controller) is displayed below the detailed information concerning a group. The group remote controller is an operation screen including information concerning buttons and so forth to be used for operation of the group. The group remote controller for the group of “Home theater” including such devices as the TV 21 and soundbar 22 includes a power supply button, a channel button, and a sound volume adjustment button.

The power supply button is a button used for switching on/off the power supply to all devices configuring the group of “Home theater.”

The channel button is a button used for selection of a channel to be selected on the TV 21.

The sound volume adjustment button is a button used for adjustment of the sound volume of content to be viewed on the TV 21. In a case where the group of “Home theater” is selected, the sound of the content to be viewed on the TV 21 is outputted, for example, with use of the speaker of the TV 21 and the soundbar 22.

In such a manner, on the group detailed screen, information that is used to operate the overall devices configuring the group is displayed. The display of the group remote controller is display of contents that are different depending upon the type of devices configuring the group and the Capability of the group, which are represented, for example, by information acquired from the device management server 1.

On the other hand, in a case where the device selection button 74 on the Home screen is operated, a device detailed screen is displayed as depicted at the destination of an arrow mark #22. At an upper portion of the device detailed screen, detailed information concerning the BT speaker that is a single piece of device is displayed. As the detailed information, an icon representative of the device is displayed, and a group addition button 112 is displayed beside the icon.

In a case where the group addition button 112 is operated, a selection screen for a group to which a BT speaker is to be added is displayed. On the selection screen, a list of groups already created and so forth is displayed. By selecting a desired group on the selection screen, the user can add the BT speaker as a device that configures the group.

Not only addition of a device in which a device to be added to a group is selected in a state in which the group is selected, that could be called addition of a device starting from a group, but also addition of a device starting from a device in which a group to which a device is to be added is selected in a state in which the device is selected is possible. Addition of a device starting from a device is described later.

A single piece remote controller is displayed below the device detailed information. The single piece remote controller is an operation screen including information concerning buttons to be used for operation of a BT speaker and so forth. The single piece remote controller for a BT speaker includes a power supply button and a sound volume adjustment button.

The power supply button is a button used to switch on/off the power supply to the BT speaker.

The sound volume adjustment button is a button used for adjustment of the sound volume of the BT speaker.

In such a manner, information that is used to operate a single piece of device is displayed on the device detailed screen. The display of the single piece remote controller is display of contents that are different, for example, depending upon the type and the Capability of the device represented by the information acquired from the device management server 1.

<Process Upon Operation of Device>

A series of processes at the time of operation of a device is described with reference to a flow chart of FIG. 12.

Here, a process in a case where the group selection button 71 is operated on the Home screen and operation is performed targeting the group of "Home theater" with use of the screen of the group remote controller is described. The devices that configure the group of "Home theater" are the TV 21 and the soundbar 22 as described hereinabove with reference to FIG. 11.

In step S201, the smart home application 2A requests control of the group of "Home theater" to the device management server 1 in response to operation performed by the user. The request to the device management server 1 includes the group ID of a group of an operation target, information representative of contents of the operation performed by the user, and so forth.

In step S211, the device management server 1 receives the information transmitted thereto from the smart home application 2A. The device management server 1 specifies, in reference to the information managed in association with the account of the user, that the devices configuring the group of "Home theater" are the TV 21 and the soundbar 22.

In step S212, the device management server 1 transmits a control command corresponding to contents of the operation performed by the user to the TV 21.

In step S213, the device management server 1 transmits the control command corresponding to contents of the operation performed by the user to the soundbar 22. The control command transmitted from the device management server 1 to the TV 21 and the soundbar 22 is a group controlling command for controlling the behavior of the group.

In step S221, the TV 21 receives the control command transmitted thereto from the device management server 1 and executes a behavior in accordance with the control command. For example, various behaviors such as selection of a channel, adjustment of the sound volume, setting of audio, and so forth are performed.

In step S231, the soundbar 22 receives the control command transmitted thereto from the device management server 1 and executes a behavior in accordance with the control command. For example, various behaviors such as adjustment of the sound volume, setting of sound quality, and so forth are performed.

After the behavior according to the control command is performed individually by the TV 21 and the soundbar 22, the processing is ended.

Figure 13:
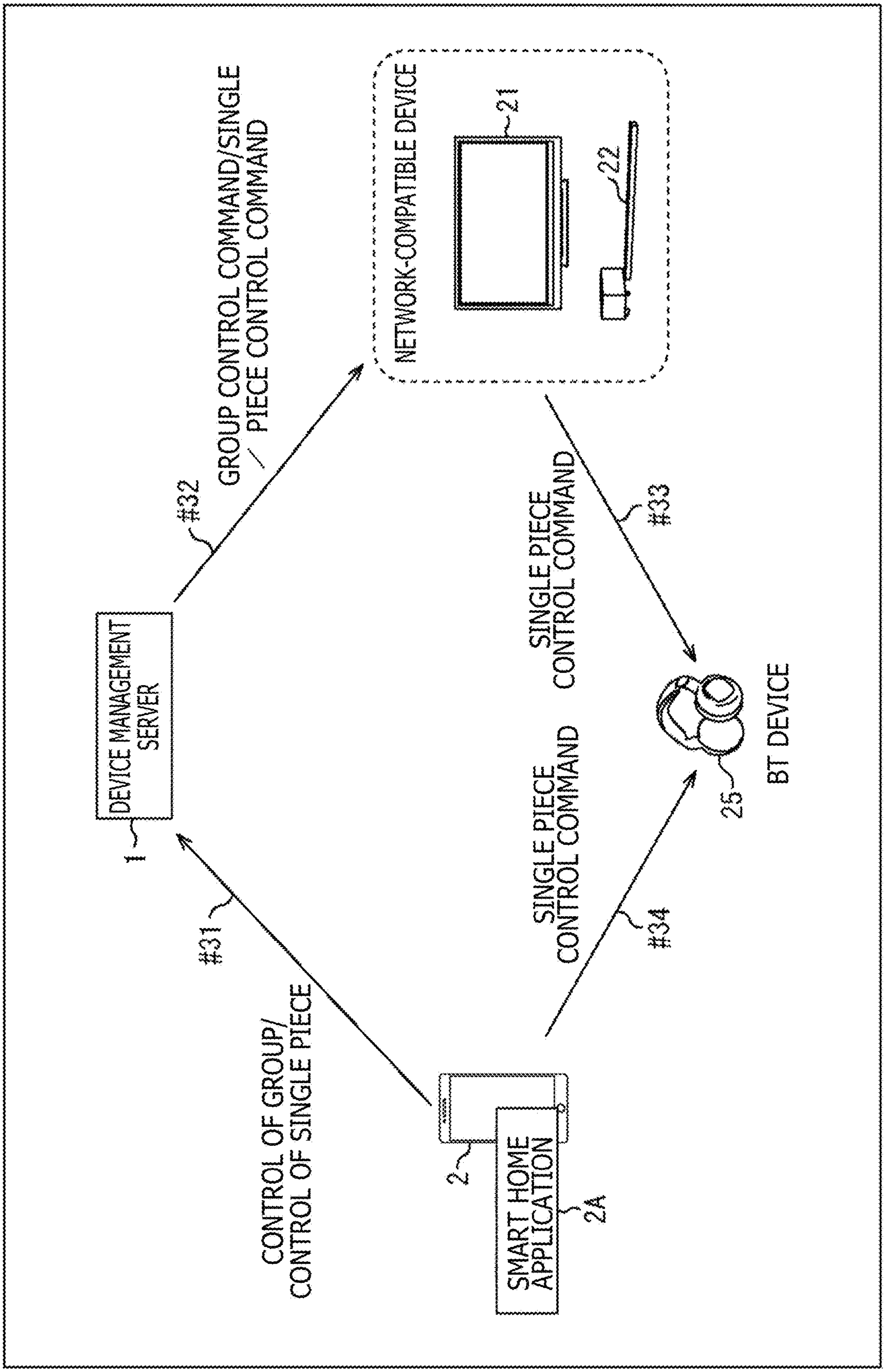
FIG. 13 is a view depicting an example of information to be transmitted and received at the time of operation of a device.

FIG. 13 is a view depicting an example of information to be transmitted and received at the time of operation of a device.

Figure 12:
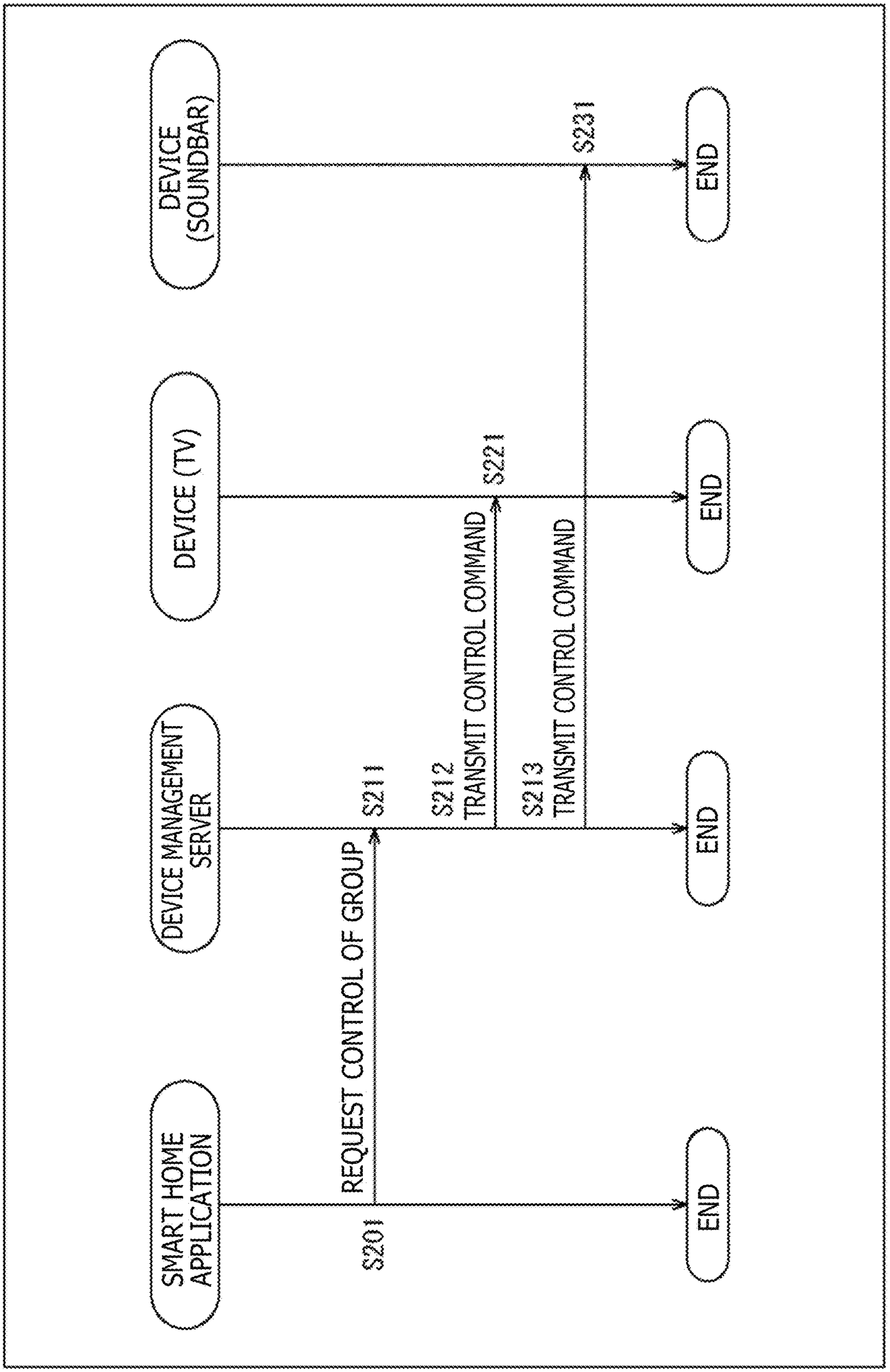
FIG. 12 is a flow chart illustrating a series of processes performed at the time of operation of a device.

As indicated by an arrow mark #31, information representing a request for control of a group is transmitted from the smart home application 2A to the device management server 1 (step S201 of FIG. 12).

As indicated by an arrow mark #32, a group controlling command including a control command to the TV 21 and a control command to the soundbar 22 is transmitted from the device management server 1 to the TV 21 and the soundbar 22 (step S212 of FIG. 12).

On the other hand, in a case where the user selects the headphone 25 that is a single piece of BT device as an operation target, information representing a request for control of a device as a single piece is transmitted from the smart home application 2A to the device management server 1, as indicated by the arrow mark #31.

The control command targeting the headphone 25 is transmitted, for example, to the TV 21 that becomes a parent device as indicated by the arrow mark #32 and is transmitted to the headphone 25 as indicated by an arrow mark #33 via the TV 21. The control command targeting the headphone 25 is a single piece control command used for control of a device as a single piece.

The single piece control command targeting the headphone 25 is suitably transmitted from the smart home application 2A to the headphone 25 as indicated by an arrow mark #34.

By the processes described above, the user can operate a group including multiple devices with a sense of feeling similar to that when the user operates a single piece of device.

Such operation of a group as described above may be made possible on a device different from the smartphone 2. In the device that is used for operation of a group such as the TV 21, a program having functions similar to those of the smart home application 2A is installed.

Consequently, it is possible for the user to operate the TV 21 to perform creation of a group or the like. It may also be made possible to operate, for example, a speaker in which functions of a voice agent are incorporated, such that creation of a group and so forth can be performed by voice.

<<Use Case of Smart Home Application>>

The user can use the smart home application 2A to create a group including any desired devices and operate multiple devices in a unit of a group. Further, the user can use the smart home application 2A to easily change devices that configure a group.

Use cases of the smart home application 2A having such functions as described above are described.

<First Use Case (Example in which Sound of Content is Outputted in Different Room)>

Figure 14:
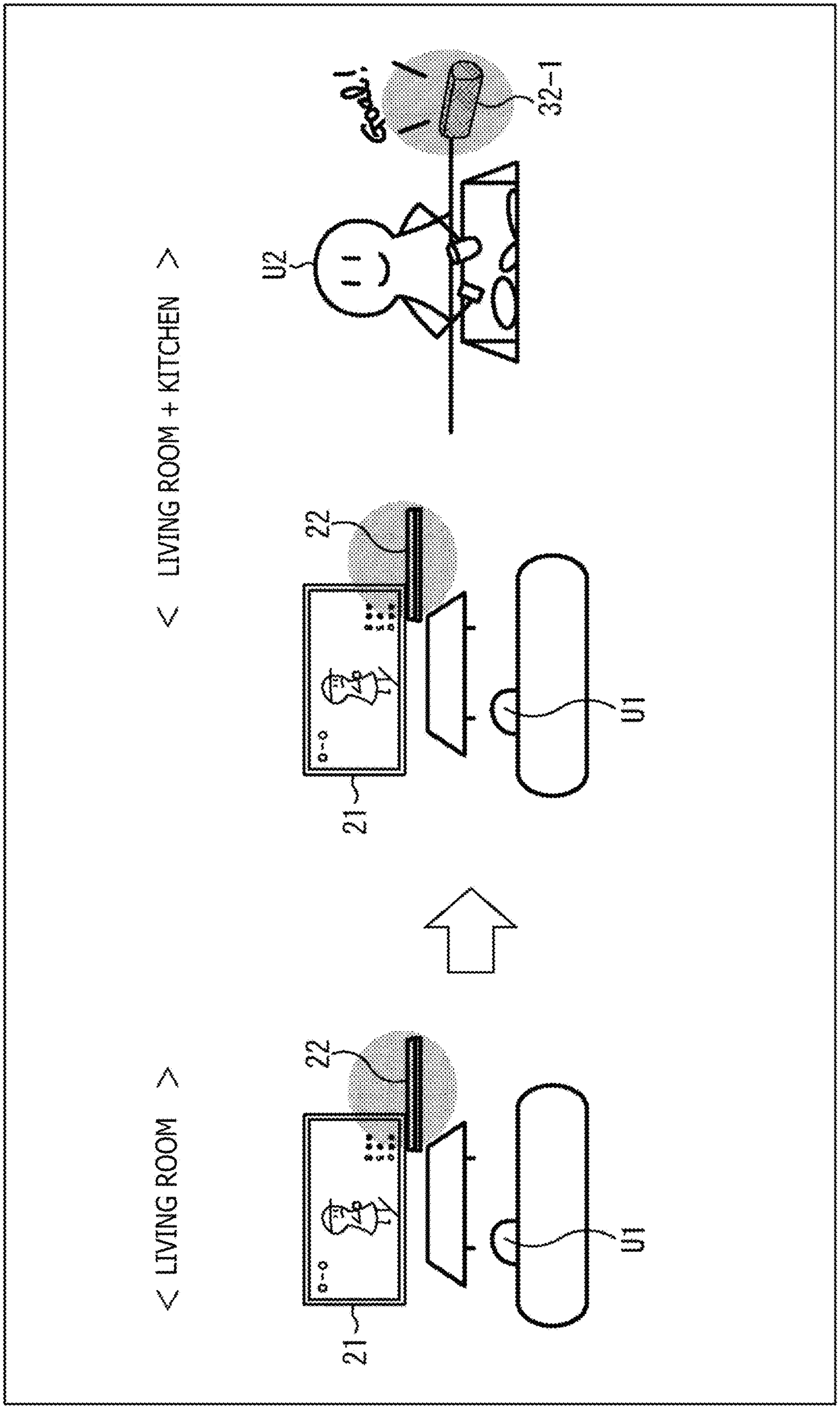
FIG. 14 is a view depicting a situation during viewing of content.

FIG. 14 is a view depicting a situation during viewing of content.

Described is a case in which, as depicted on the left side in FIG. 14, a user U1 who is viewing content in the living room tries to cause sound of the content to be outputted also from a speaker in the kitchen. It is assumed that, for example, the user U1 is a child and a parent of the user U1 is in the kitchen.

In the example depicted on the left side in FIG. 14, a screen image of content is displayed, and sound of the content is outputted from the TV 21 and the soundbar 22. The TV 21 and the soundbar 22 are devices installed in the living room and configure the group of "Home theater."

By operating the smart home application 2A to add a speaker 32-1 in the kitchen to the group of "Home theater," the user U1 can cause sound of the content to be outputted also from the speaker 32-1 as depicted on the right side in FIG. 14. A user U2 who is working in the kitchen can also listen to the sound of the content.

Figure 15:
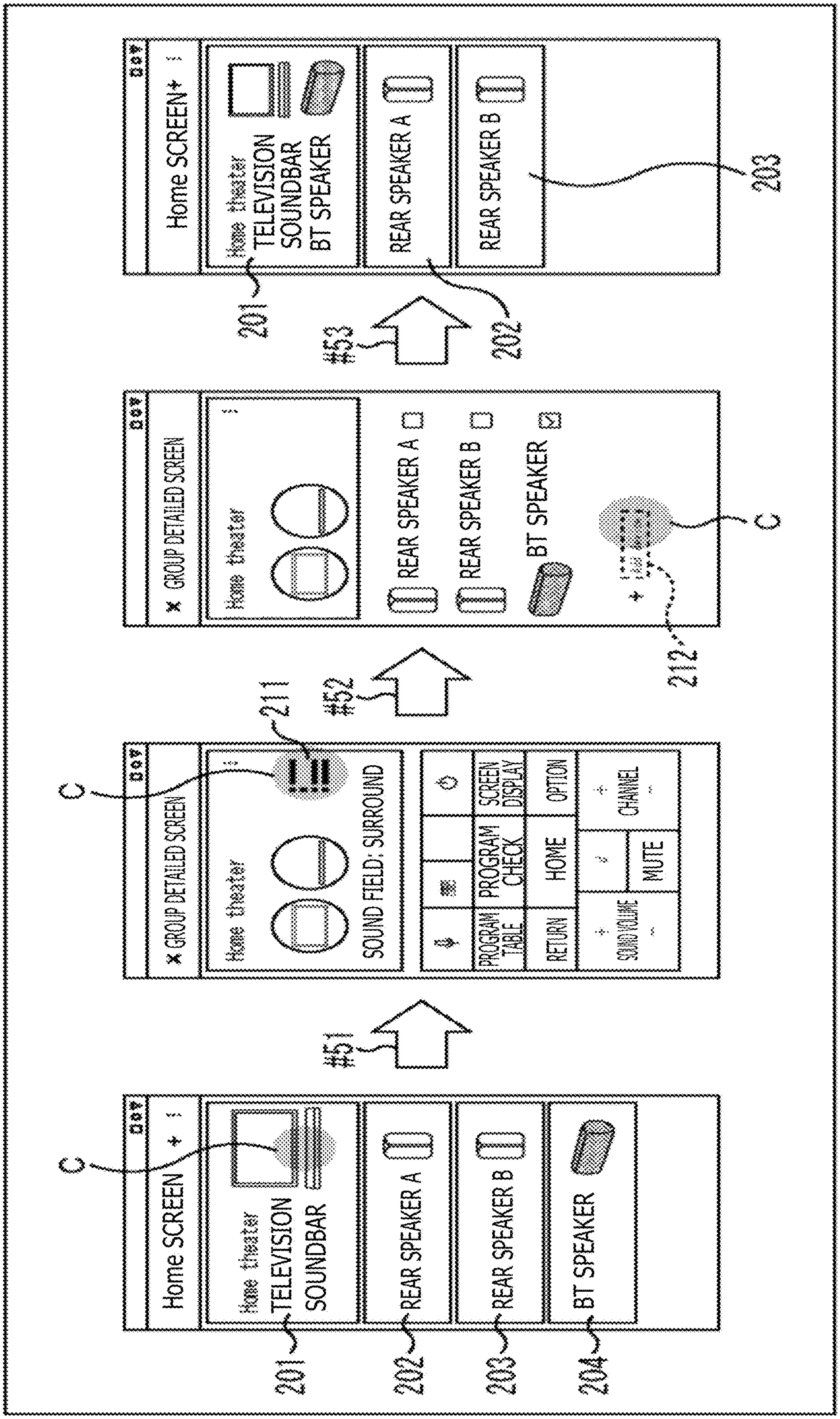
FIG. 15 is a view depicting an example of screen transition at the time of addition of a device.

FIG. 15 is a view depicting an example of screen transition at the time of addition of a device.

In a case where the speaker 32-1 in the kitchen is to be added to the group of "Home theater," the user U1 selects the group of "Home theater" from within the Home screen as depicted on the left side in FIG. 15.

In the Home screen depicted on the left side in FIG. 15, device selection buttons 202 to 204 representative of the rear speaker A, the rear speaker B, and the BT speaker, respectively, are displayed together with a group selection button 201 representative of the group of the "Home theater." The speaker 32-1 in the kitchen is a BT speaker represented, for example, by the device selection button 204.

In a case where the group of "Home theater" is selected, a detailed screen of the group of the "Home theater" is displayed as indicated at the destination of an arrow mark #51. On the detailed screen, an option button 211 is selected.

In a case where the option button 211 is operated to select addition of a device, a list of devices that can be added to the group of "Home theater" is displayed as indicated at the destination of an arrow mark #52.

In a case where an addition button 212 is operated in a state in which the BT speaker is selected by the check box being checked, the speaker 32-1 is added to the group of "Home theater" as indicated at the destination of an arrow mark #53. In a case where the addition button 212 is operated, processes similar to the processes described hereinabove with reference to FIG. 9 are performed to add the speaker 32-1.

The setting of the devices is changed according to a group update notification or a group controlling command transmitted from the device management server 1, and audio data of sound of the content is also transmitted from the TV 21 to the speaker 32-1. The speaker 32-1 outputs sound corresponding to the audio data transmitted thereto from the TV 21.

The processes described above establish a state in which sound of content being viewed by the user U1 in the living room is outputted also from the speaker 32-1 in the kitchen as described hereinabove with reference to FIG. 14.

<Second Use Case (Example of Change of Sound Field)>

Figure 16:
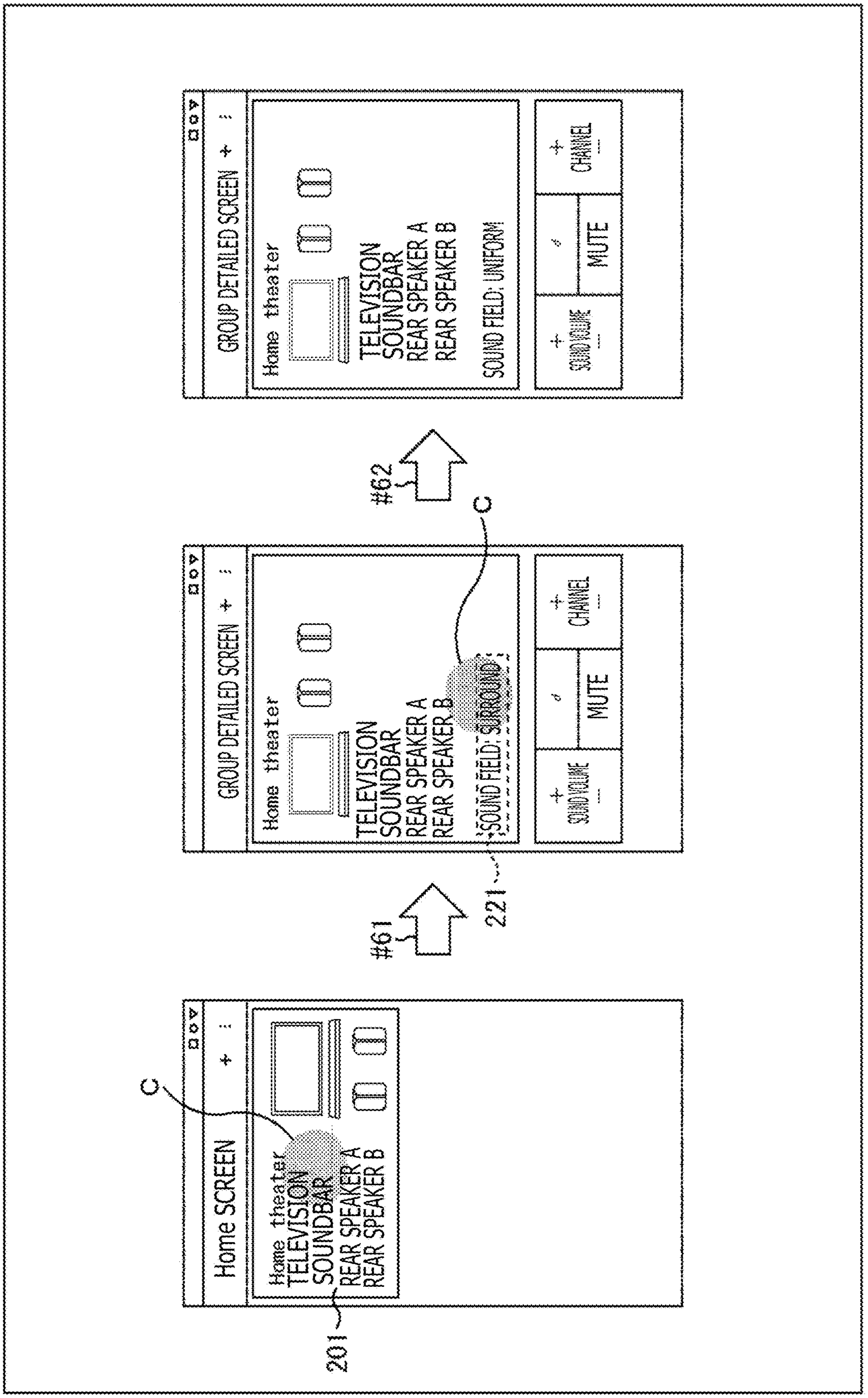
FIG. 16 is a view depicting an example of screen transition at the time of setting change of a group.

FIG. 16 is a view depicting an example of screen transition at the time of change of the setting of a behavior of a group.

In a case where the setting of the sound field of the group of "Home theater" is to be changed, the user selects the group of "Home theater" from within the Home screen as depicted on the left side in FIG. 16. In the example of FIG. 16, the group of the "Home theater" includes the TV 21, the soundbar 22, and the rear speakers A and B.

In a case where the group of "Home theater" is selected, a detailed screen of the group of the "Home theater" is displayed as indicated at the destination of an arrow mark #61. On the detailed screen, a sound field button 221 that is used for setting a sound field is displayed. In the example of FIG. 16, the setting of the sound field is "surround."

The user can change the setting of the sound field of the group of "Home theater" by operating the sound field button 221 and selecting a sound field of a different type. For example, in a case where the sound field button 221 is operated, multiple sound fields that become choices are displayed together with "surround."

For example, in a case where the sound field of "uniform" is selected, the sound field of the group of "Home theater" is changed as indicated at the destination of an arrow mark #62. In a case where a sound field different from "surround" is selected, processes similar to the processes described hereinabove with reference to FIG. 12 are performed to change the setting of the sound field of the group. The setting of the devices is changed according to a group controlling command transmitted from the device management server 1, and sound of the content is outputted with the sound field of "uniform."

The user can easily change the setting of the behavior of a group in such a manner. The user can easily set an appropriate sound field in response to the genre of the content to be viewed such as a movie or sports, for example. Various settings other than that of the sound field are changed by operation similar to such operations as described above.

<Third Use Case (Example in which Speaker in Different Room is Added)>

Figure 17:
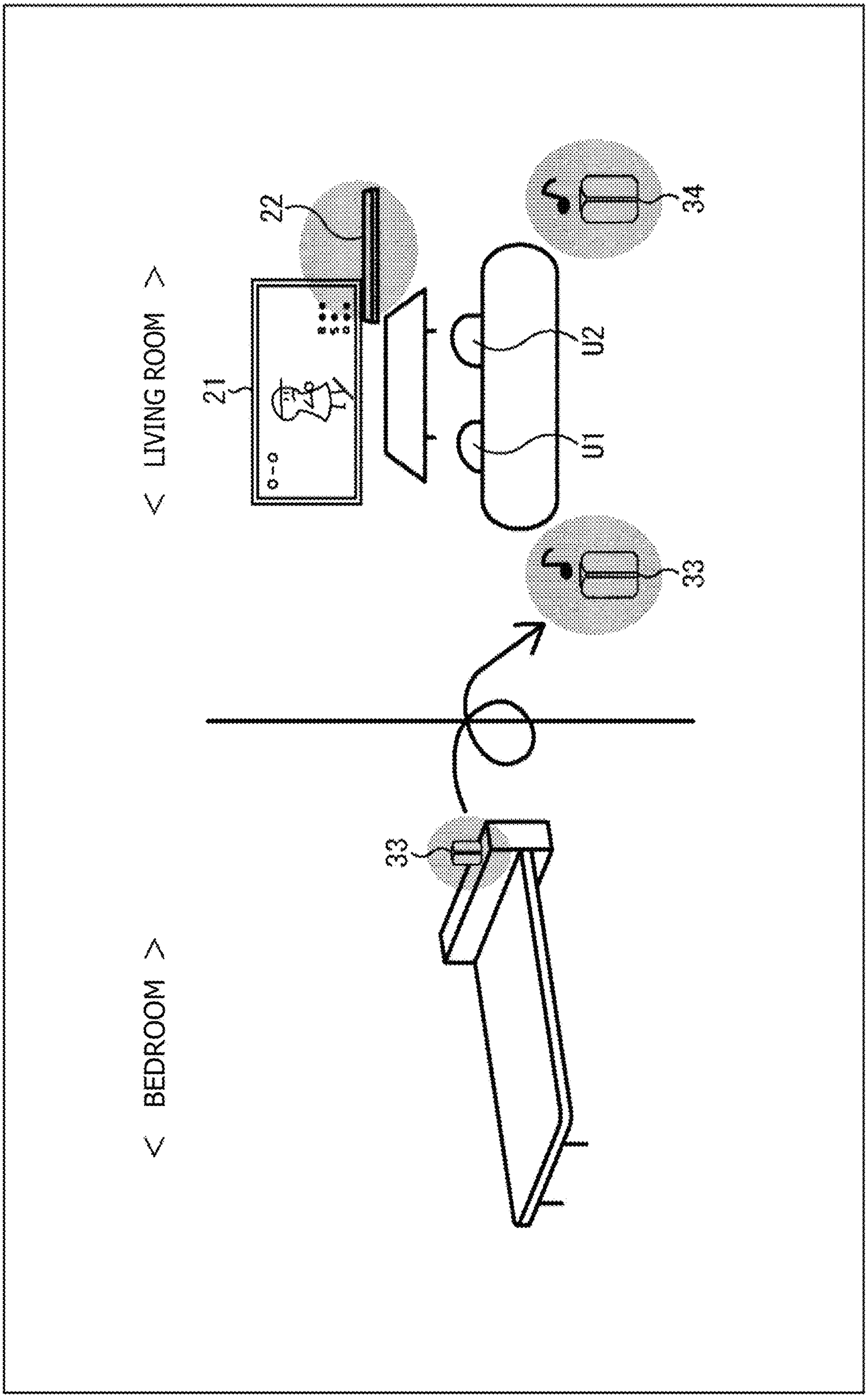
FIG. 17 is a view depicting a situation during viewing of content.

FIG. 17 is a view depicting a situation during viewing of content.

Description is given of a case in which, as a device that becomes an outputting destination of sound of content being viewed in the living room, a speaker 33 in the bedroom that is a different room is added, as depicted in FIG. 17. In the living room, viewing of content is being performed using the TV 21 and the soundbar 22.

For example, the user U1 moves the speaker 33 from the bedroom to the living room and adds the speaker 33 as a device configuring the group of "Home theater." In the example of FIG. 17, a speaker 34 having been moved from a different room is added together with the speaker 33.

The user U1 can cause sound of content to be outputted also from the speaker 33 and the speaker 34 as depicted on the right side in FIG. 17 by operating the smart home application 2A and adding the speaker 33 and the speaker 34 to the group of "Home theater." For example, sound of the content is outputted by 5.1 ch with use of the TV 21, the soundbar 22, and the speakers 33 and 34.

Figure 18:
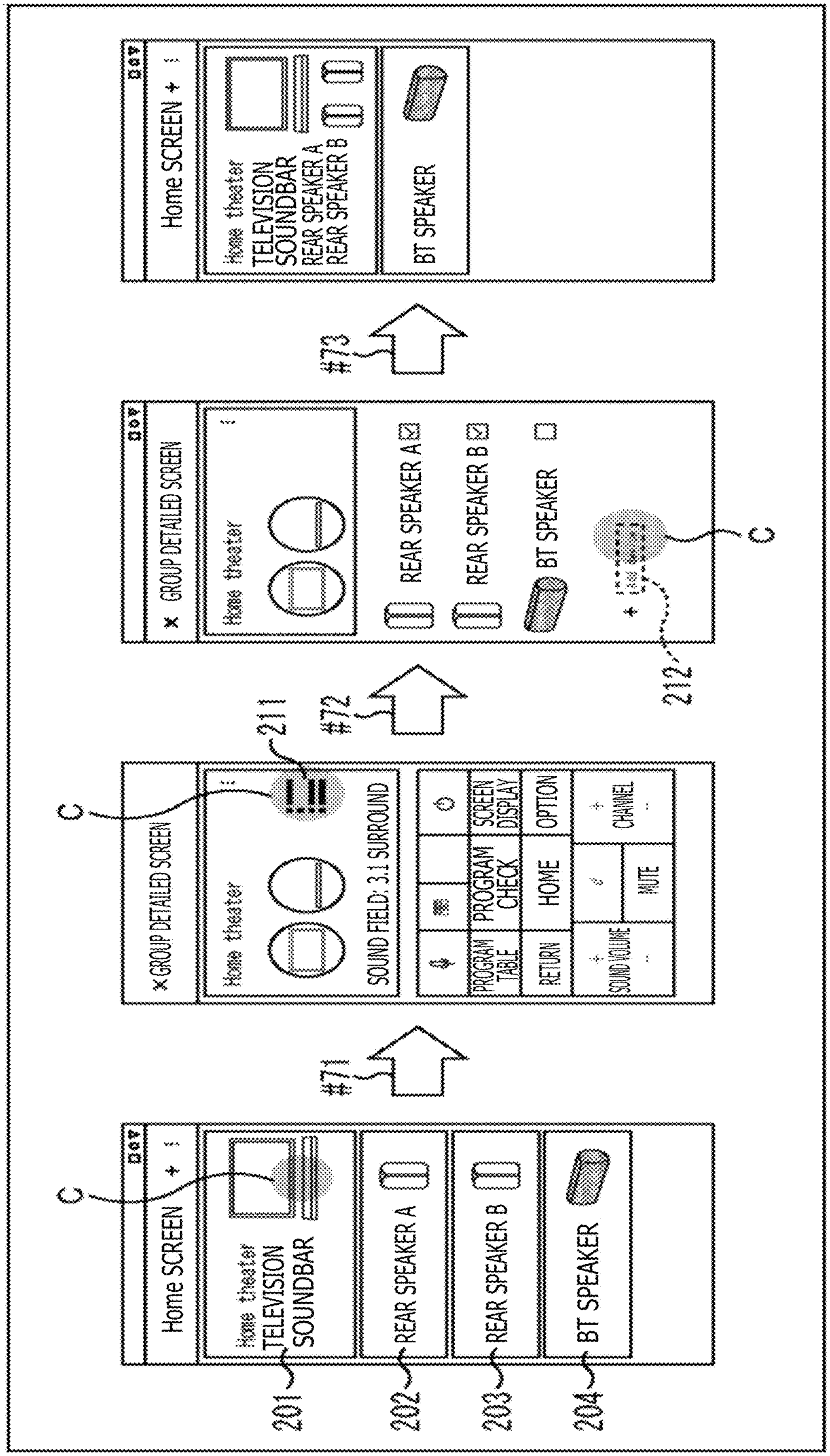
FIG. 18 is a view depicting an example of screen transition at the time of addition of a device.

FIG. 18 is a view depicting an example of screen transition at the time of addition of a device.

In a case where the speaker 33 and the speaker 34 having been moved to the living room are to be added to the group of "Home theater," the user U1 selects the group of "Home theater" from within the Home screen as depicted on the left side in FIG. 18. The Home screen depicted on the left side in FIG. 18 is a screen same as the Home screen depicted on the left side in FIG. 15. For example, the speaker 33 is represented by the device selection button 202, and the speaker 34 is represented by the device selection button 203.

In a case where the group of "Home theater" is selected, a detailed screen of the group of "Home theater" is displayed at the destination of an arrow mark #71. The option button 211 is displayed on the detailed screen.

In a case where the option button 211 is operated to select addition of a device, a list of devices that can be added to the group of "Home theater" is displayed as indicated at the destination of an arrow mark #72.

In a case where the addition button 212 is operated in a state in which the rear speaker A and the rear speaker B are selected by the check boxes being checked or by similar means, the speaker 33 and the speaker 34 are added to the group of "Home theater" as indicated at the destination of an arrow mark #73. In a case where the addition button 212 is operated, processes similar to the processes described hereinabove with reference to FIG. 8 are performed to add the speaker 33 and the speaker 34 to the group of "Home theater."

The settings of the devices are changed according to a group update notification, a group controlling command, or the like transmitted from the device management server 1, and audio data of sound of the content is also transmitted from the TV 21 to the speakers 33 and 34. The speakers 33 and 34 output sound corresponding to the audio data transmitted thereto from the TV 21.

The processes described above establish a state in which sound of content being viewed in the living room is outputted also from the speakers 33 and 34 that have been moved to the living room from the different room, as described hereinabove with reference to FIG. 17.

<Fourth Use Case (Example of Creation of Group/Addition of Device, Starting from Device)>

Creation of a group starting from a device is operation of creating a group in a state in which a device is selected. Meanwhile, addition of a device starting from a device is operation of selecting, in a state in which a device is selected, a group that becomes an addition destination of the selected device.

Figure 19:
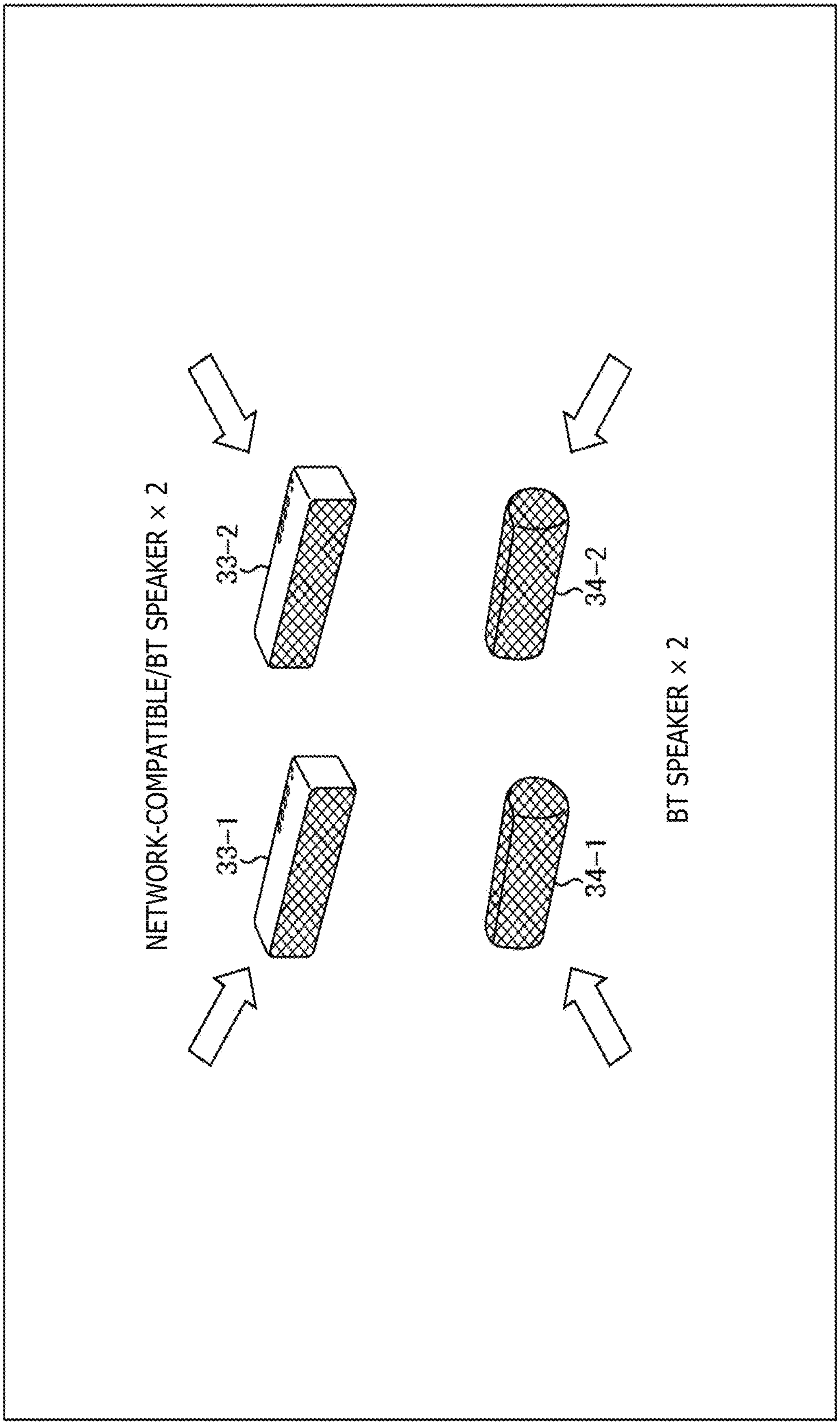
FIG. 19 is a view depicting an example of a device that is used for creation of a group.

FIG. 19 is a view depicting an example of devices that create a group.

Description is given of a case in which, as depicted in FIG. 19, a group is created from four speakers of speakers 33-1 and 33-2 and speakers 34-1 and 34-2. The speakers 33-1 and 33-2 are, for example, network-compatible BT speakers. The speakers 34-1 and 34-2 are BT speakers.

For example, the speakers 33-1 and 33-2 and the speakers 34-1 and 34-2 are devices placed in rooms different from each other. The user gathers the speakers 33-1 and 33-2 and the speakers 34-1 and 34-2 from the individual rooms to create one group.

Figure 20:
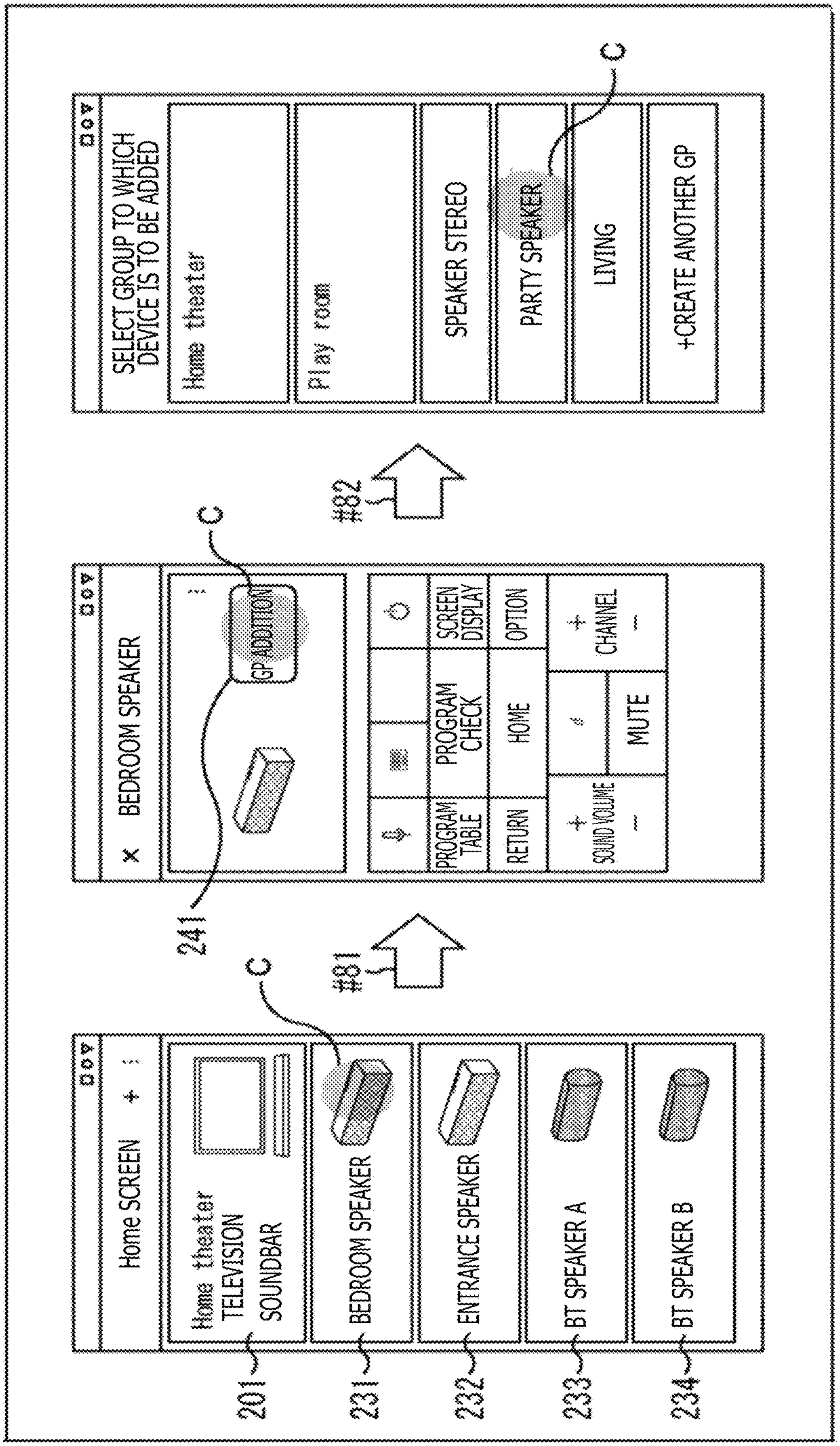
FIG. 20 is a view depicting an example of screen transition at the time of creation of a group.

FIG. 20 is a view depicting an example of screen transition at the time of creation of a group.

In a case where a group is to be created from the speakers 33-1 and 33-2 and the speakers 34-1 and 34-2, the user will select a device (speaker) for which the name of "bedroom speaker" is set from within the Home screen as depicted on the left side in FIG. 20. Not only a desired name can be set for a group, but also the user can set a desired name for a device in such a manner.

On the Home screen depicted on the left side in FIG. 20, device selection buttons 231 to 234 representing the speakers of "bedroom speaker," "entrance speaker," "BT speaker A," and "BT speaker B", respectively, are displayed together with the group selection button 201 representative of the group of "Home theater." For example, the speakers 33-1 and 33-2 are represented by the device selection buttons 231 and 232, respectively, and the speakers 34-1 and 34-2 are represented by the device selection buttons 233 and 234, respectively.

In a case where "bedroom speaker" is selected, a detailed screen of the speaker of "bedroom speaker" is displayed as indicated at the destination of an arrow mark #81. On the detailed screen, a group addition button 241 is displayed. The group addition button 241 is a button that is operated when a group that becomes an addition destination of the device displayed in the detailed screen is selected.

In a case where the group addition button 241 is operated to issue an instruction for selection of a group, a list of groups to which the speaker of "bedroom speaker" can be added is displayed as indicated at the destination of an arrow mark #82. In the list of the groups to which a device can be added, a group to be newly created is displayed in addition to the group of "Home theater" already created. In an example on the right side in FIG. 20, the name of a group to be newly created can be selected from among "car stereo," "party speaker," and "living".

For example, in a case where the name of "party speaker" is operated, processes similar to the processes described hereinabove with reference to FIG. 3 are performed to create a group of "party speaker." The group of "party speaker" is a group including the speaker of "bedroom speaker."

It is to be noted that, in a case where "Home theater" is selected in the list of groups depicted on the right side in FIG. 20, processes similar to the processes described hereinabove with reference to FIG. 8 are performed to add the speaker of "bedroom speaker" to the group of "Home theater."

In such a manner, selecting a group from within a device detailed screen that is displayed when a device is selected makes it possible to create a group or add a device, starting from a device.

Figure 21:
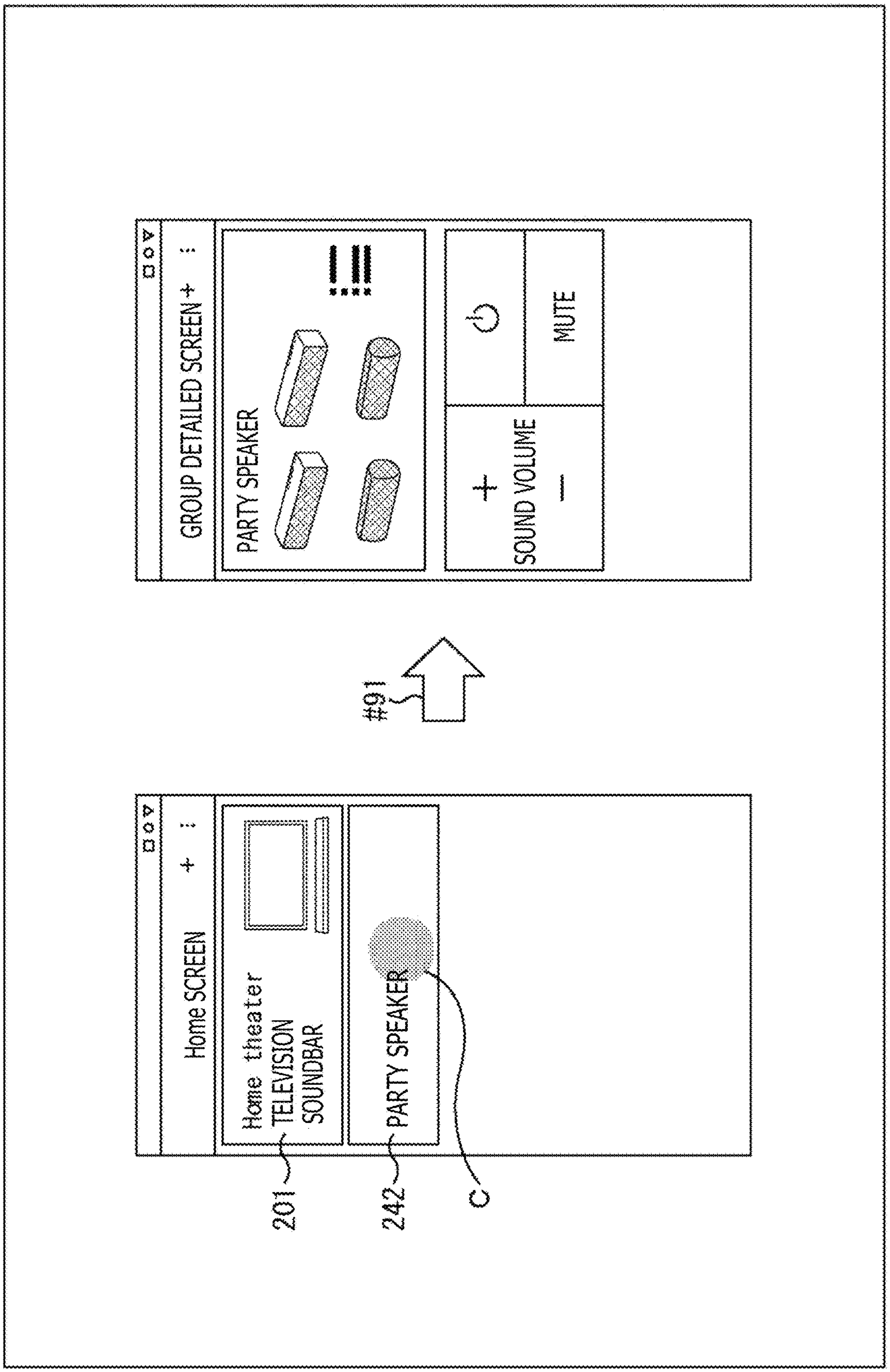
FIG. 21 is a view depicting an example of a group detailed screen.

By the speaker 33-2 and the speakers 34-1 and 34-2 being added to the group of "party speaker", the group of "party speaker" becomes a group including four speakers of the speakers 33-1 and 33-2 and the speakers 34-1 and 34-2. In a case where a group selection button 242 is operated on the Home screen to select the group of "party speaker" as depicted in FIG. 21, a group detailed screen indicated at the destination of an arrow mark #91 is displayed.

In such a manner, in a state in which a device is selected, the user can create a group or select a group to be made an addition destination of the device.

Gathering multiple speakers to create a group is performed, for example, in such a case where many users enjoy music together in a wide place such as a garden. In a case where "party speaker" is selected as the outputting destination of music, for example, data of music reproduced by the smartphone 2 is transmitted to the speakers 33-1 and 33-2 and the speakers 34-1 and 34-2, and the music is outputted from the four speakers.

A group canceling function may be provided. The cancellation of a group is implemented, for example, by deleting all devices configuring the group from the group. In a case where the group is cancelled, each of the devices may be restored as a device configuring a group to which the device belonged prior to the cancelled group.

<Fifth Use Case (Example of Switching of Device)>

Deleting a certain device configuring a group and adding another device in place of the deleted device implement switching of a device that configures the group.

Figure 22:
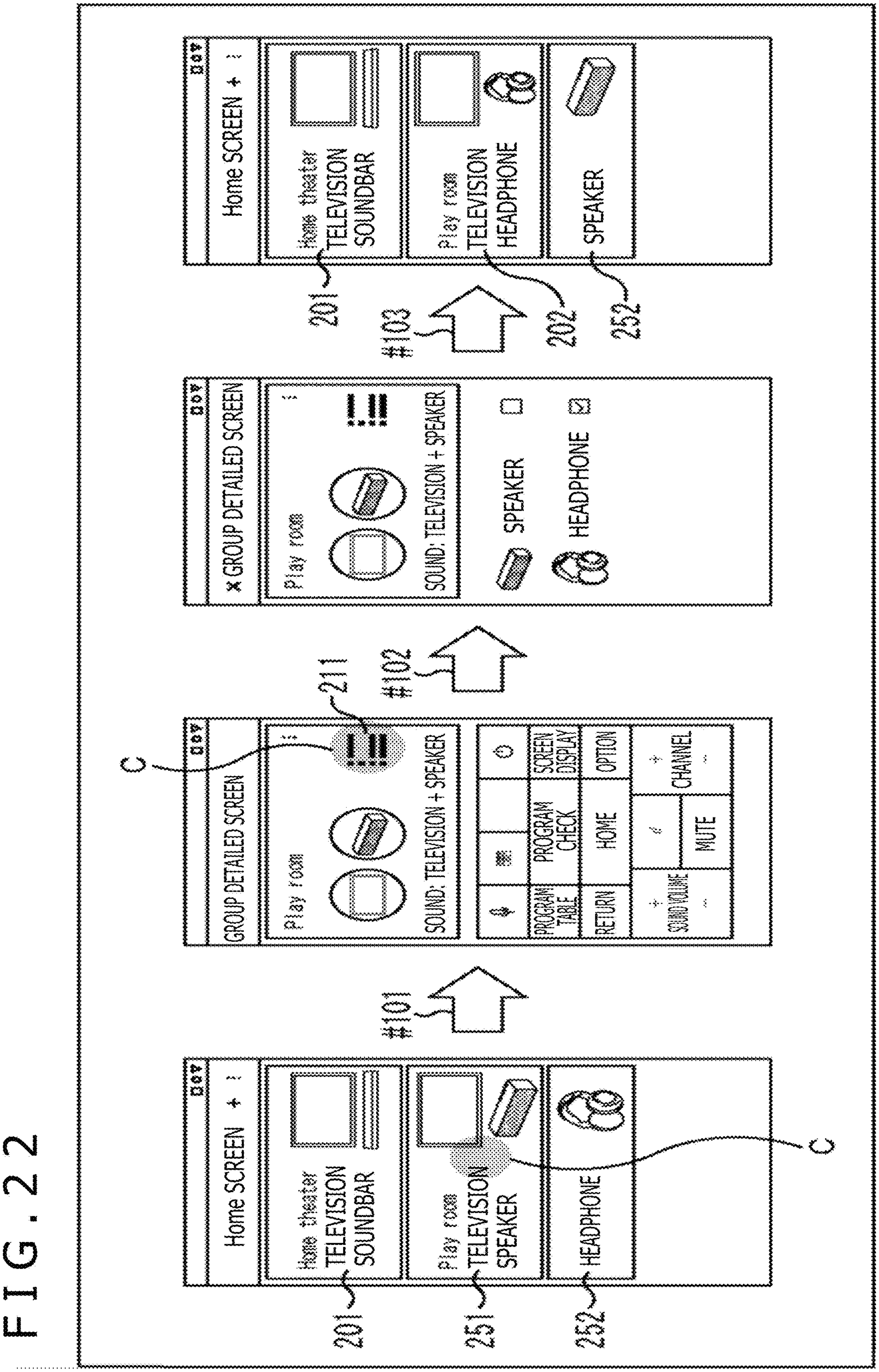
FIG. 22 is a view depicting an example of screen transition at the time of switching of devices configuring a group.

FIG. 22 is a view depicting an example of screen transition at the time of switching of devices configuring a group.

On the Home screen depicted on the left side in FIG. 22, a device selection button 252 representative of the headphone 25 is displayed together with the group selection button 201 representative of the group of "Home theater" and a group selection button 251 representative of the group of "Play room." The group of "Play room" is a group including a TV and a speaker.

In a case where the group of "Play room" is selected, a detailed screen of the group of "Play room" is displayed as indicated at the destination of an arrow mark #101. On the detailed screen, the option button 211 is displayed.

In a case where the option button 211 is operated, a list of devices is displayed as indicated at the destination of an arrow mark #102. In this example, the speaker belonging to the group of "Play room" and the headphone 25 that does not belong to any group are displayed.

In a case where a check for the speaker is cleared and the check box or the like is checked to select the headphone 25, the headphone 25 is added in place of the speaker to the group of "Play room" as indicated at the destination of an arrow mark #103. In a case where the headphone 25 is selected, the speaker is deleted from the group of "Play room," and the headphone 25 is added to the group of "Play room."

The setting of the behavior of each device is changed according to a group update notification, a group controlling command, or the like transmitted from the device management server 1, and sound of content is transmitted from the TV to the headphone 25. The headphone 25 outputs sound corresponding to audio data transmitted thereto from the TV.

For example, the group of "Play room" is a group created by the user as a group to be used in a case where a game is played using the TV. Sound of the game is outputted from the speaker and the headphone 25. For example, in a case where the user plays a game alone, the headphone 25 is added as a device that configures the group of "Play room," but in a case where a game is played by multiple persons, a speaker is added as a device that configures the group of "Play room."

Figure 23:
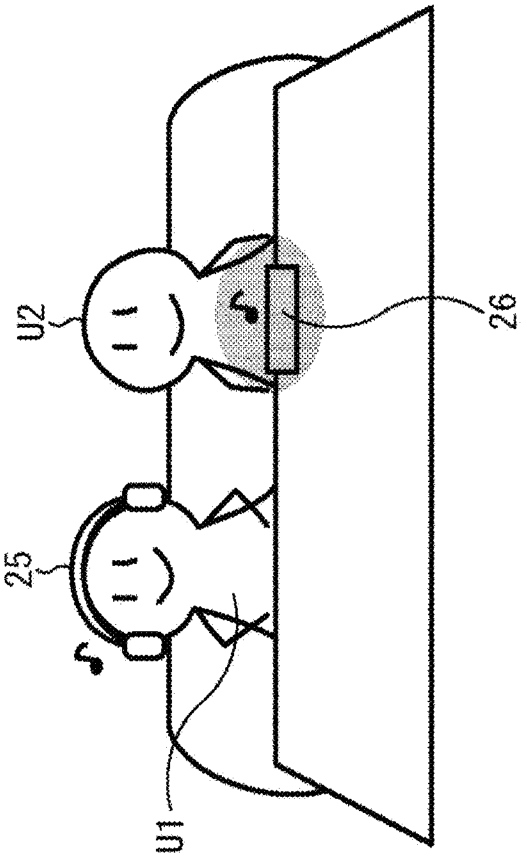
FIG. 23 is a view depicting a situation in which devices different between users are used.

By changing a device that configures a group in such a manner, the user can easily switch the outputting destination of sound to any outputting destination. As depicted in FIG. 23, it also becomes possible that, among the user U1 and the user U2 who play the game together, the User 1 listens to sound of the game by using the headphone 25 while the user U2 listens to the sound of the game by using another speaker 26.

Although operation for implementing an optimum sound field by changing a device to be made an outputting destination of sound or by changing the setting of a behavior of a group is described, various kinds of operation other than the operation relating to outputting of sound are performed with use of the smart home application 2A. For example, a behavior of multiple home appliances that configure a group and a behavior of multiple IoT devices configuring a group are controlled similarly by operation on the smart home application 2A.

<<Automatic Setting of Group>>

While it has been described above that setting of a group is performed according to operation performed by a user on a screen of the smart home application 2A, it may otherwise be performed automatically irrespective of operation performed by a user.

In this case, a context is recognized, and setting of a group is performed according to a result of the recognition of a context by the device management server 1.

Figure 24:
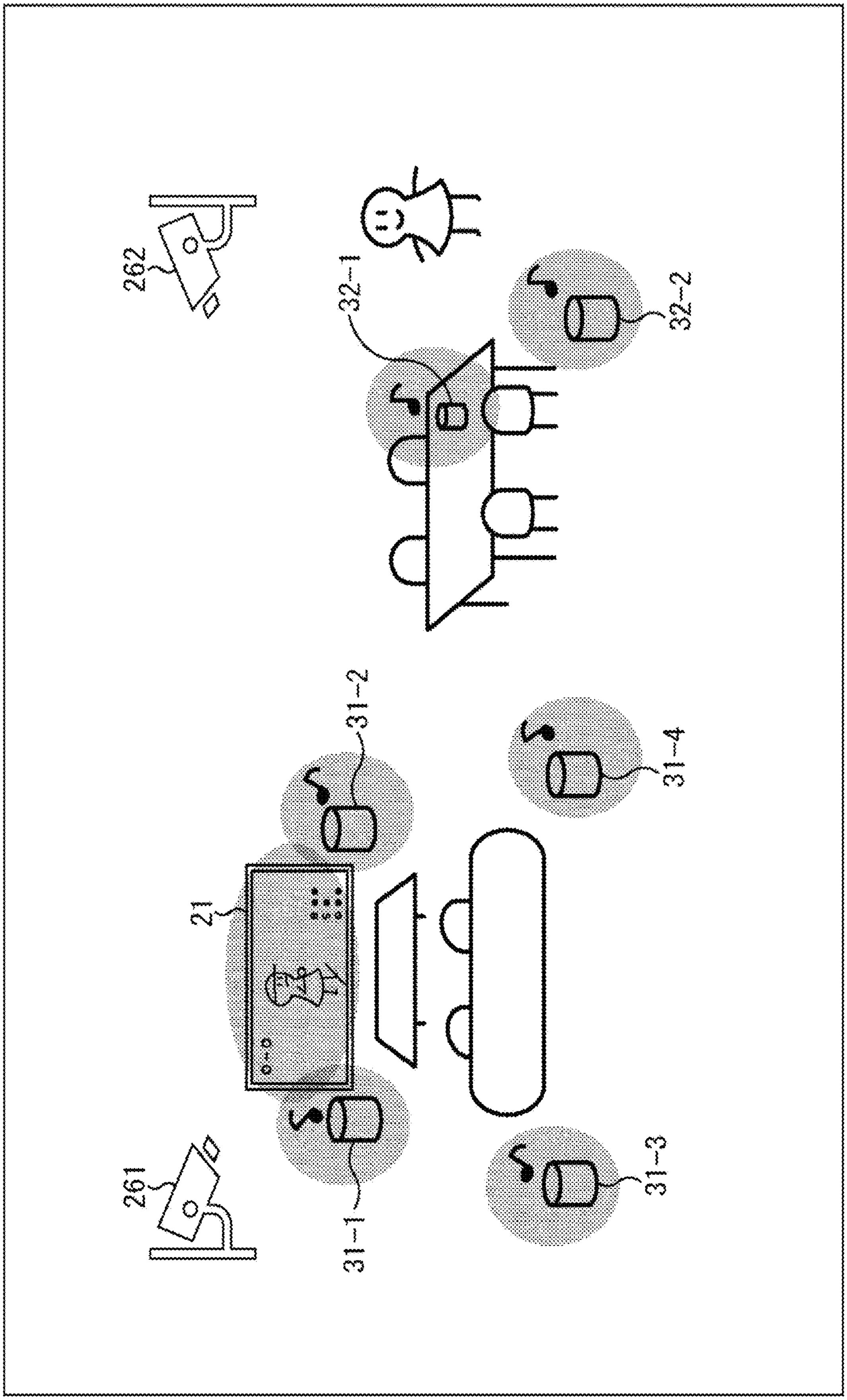
FIG. 24 is a view depicting a situation of sensing.

FIG. 24 is a view depicting a situation of sensing.

In a case where setting of a group is to be performed automatically, a sensor such as a camera or a microphone is provided in a space in which a device is located. In the example of FIG. 24, cameras 261 and 262 are installed in rooms of a user's own house.

The sensor may be provided on the device, or a sensor incorporated in the smartphone 2 may be used for sensing. The sensor includes, in addition to a camera and a microphone, various sensors such as a position measurement sensor, a distance sensor, an acceleration sensor, a temperature sensor, and an illuminance sensor. Biosensors for measuring biological information of a user such as a body temperature, a heart rate, a pulse rate, and a blood pressure may be used for the sensing.

Figure 25:
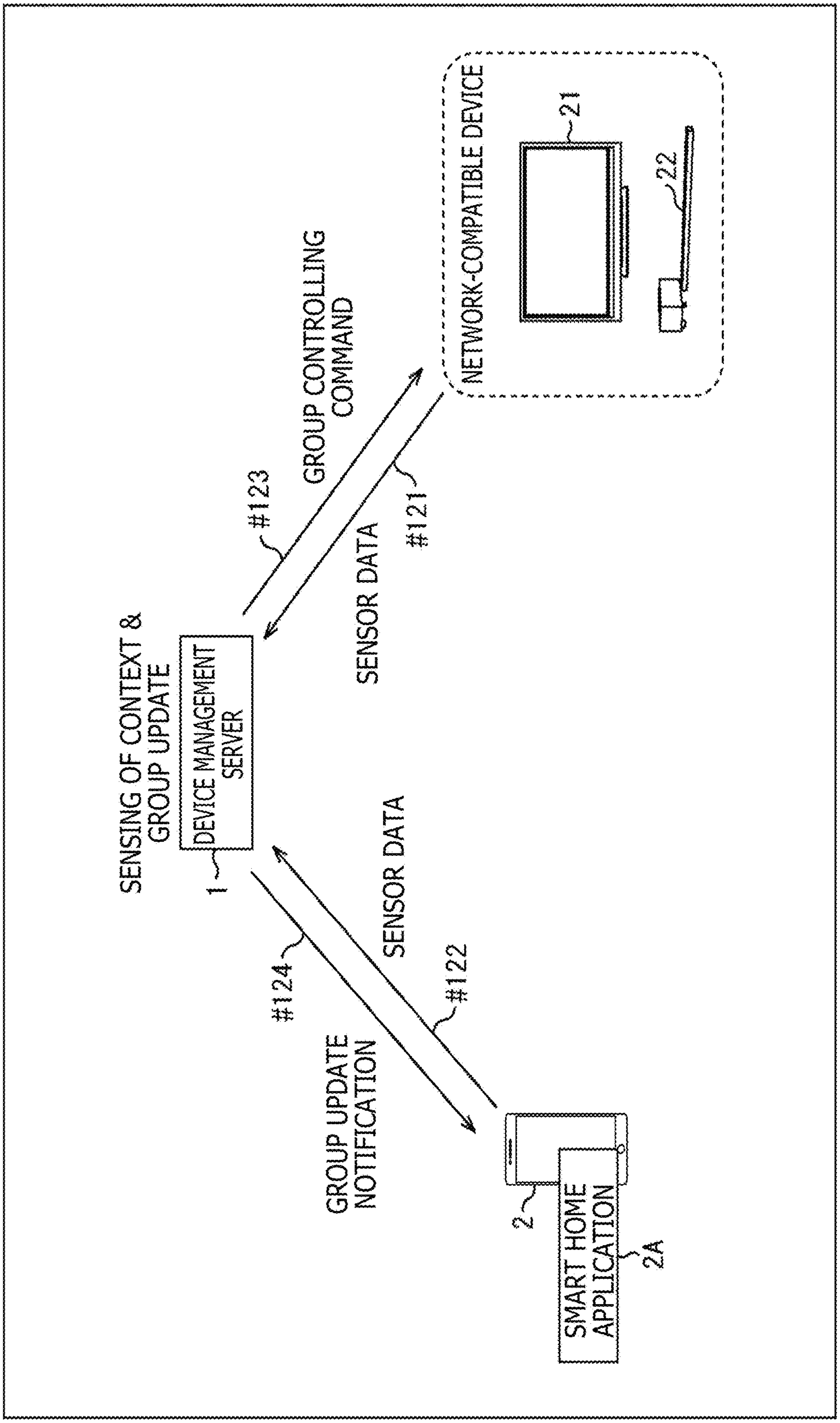
FIG. 25 is a view depicting an example of information to be transmitted and received in a case where management of a group is automatically performed.

FIG. 25 is a view depicting an example of information transmitted and received in a case where setting of a group is performed automatically.

As indicated by an arrow mark #121, sensor data measured by a sensor such as a camera is transmitted to the device management server 1.

In a case where a sensor incorporated in the smartphone 2 is used, sensor data measured in the smartphone 2 is also transmitted similarly to the device management server 1 as indicated by an arrow mark #122.

In the device management server 1, analysis of the sensor data is performed, and recognition of a context is performed. The recognition of a context may be performed by statistical analysis based on the sensor data or may be performed using an inference model. The inference model used for recognition of a context is created in advance, for example, by machine learning in which data that associates sensor data and a recognition result of a context with each other is used as teacher data, and is provided in the device management server 1.

For example, a state of the user including a behavior and a psychological state of the user is recognized. Further, a state of a device including a position of the device, a use state of the power supply such as on/off, and a state of content being reproduced is recognized. A state of a space in which the device is installed including whether or not a person is in a room in which the device is installed and a state of the room such as brightness of the room is recognized. At least one of the state of the user, the state of the device, and the state of the space is recognized as a context by the device management server 1.

Instead of all processes relating to recognition of a context being performed by the device management server 1, part of the processes may be performed by the edge side (camera or smartphone 2 side).

Further, in the device management server 1, setting of a group is performed according to a context recognized as a result of the recognition.

In a case where a device configuring a group is changed according to a context, a group controlling command targeting the group obtained after the change is transmitted from the device management server 1 to the devices configuring the group, as indicated by an arrow mark #123.

As indicated by an arrow mark #124, information concerning the group obtained after the change is conveyed to the smart home application 2A.

In such a manner, using a result of recognition of a context allows creation of a group and change of a device configuring a group to be performed automatically.

In the device management server 1, as a trigger for automatic setting of a group, such various contexts as described in the description of the first to fifth use cases are used.

For example, in the first use case (FIG. 14), by analyzing an image captured by a camera or by similar means, the user U2 being present in the kitchen while content is being viewed in the living room is specified as a result of recognition of a context. According to the result of recognition of the context, the speaker 32-1 in the kitchen is added to the group of "Home theater" and is used as an outputting destination of sound of the content.

Meanwhile, in the second use case (FIG. 16), the genre of the content being viewed by the user is specified as a result of recognition of a context. For example, from device state information set by the device management server 1, the genre of the content being viewed by the user is specified. According to the result of recognition of the content, the setting of the sound field of the group of "Home theater" is changed from "surround" to "uniform."

In the third use case (FIG. 17), by analyzing an image captured by the camera or by similar means, the user U1 having moved the speaker 33 in the bedroom to the living room is specified as a result of recognition of a context. According to the result of recognition of the context, the speaker 33 that has been moved to the living room from the bedroom is added to the group of "Home theater" and is used as an outputting destination of sound of the content.

In such a manner, in the device management server 1, creation of a group, change of a device configuring the group, change of setting of a behavior of the group, and so forth are performed according to a result of recognition of various kinds of contexts.

Consequently, for example, such control as to automatically switch a speaker from which sound is to be outputted or to switch an agent device that responds to an utterance of the user according to a room in which the user is present becomes possible. Recognition of a context may be performed by the smart home application 2A such that a result of recognition of a context is transmitted to the device management server 1.

Even in a case where the user moves to a different room, it is possible to continue an interaction with an agent or continue listening to music.

<<Configuration of Devices>>

<Configuration of Device Management Server 1>

Figure 26:
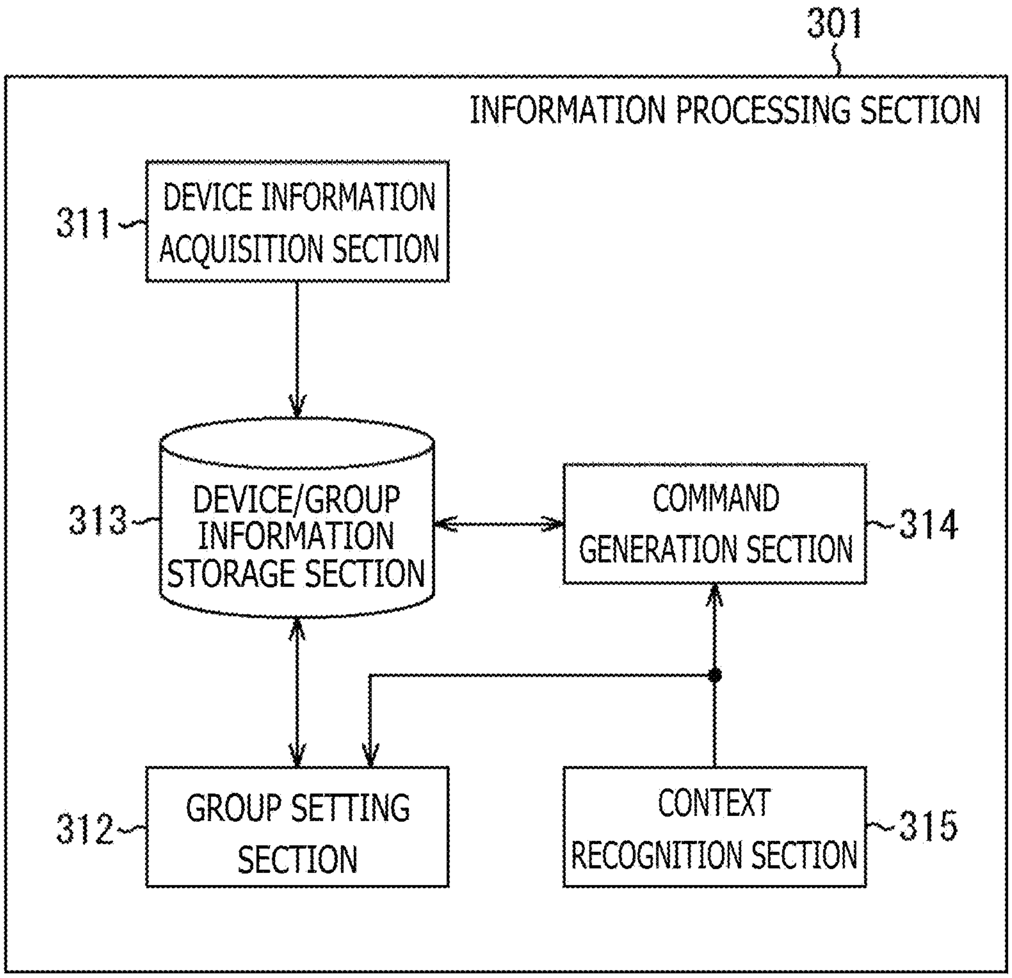
FIG. 26 is a block diagram depicting an example of a functional configuration of a device management server.

FIG. 26 is a block diagram depicting an example of a functional configuration of the device management server 1.

As depicted in FIG. 26, an information processing section 301 is implemented in the device management server 1. The information processing section 301 includes a device information acquisition section 311, a group setting section 312, a device/group information storage section 313, a command generation section 314, and a context recognition section 315. The configuration depicted in FIG. 26 is implemented by a predetermined program executed by a CPU of a computer configuring the device management server 1.

The device information acquisition section 311 performs communication with a device to acquire device information and Capability information transmitted thereto from the device at the time of device registration. Further, the device information acquisition section 311 acquires device state information transmitted thereto from the device. The device information acquisition section 311 causes the device/group information storage section 313 to store the acquired information in an associated relation with the account information of the user.

For example, the processes in steps S11 and S12 in FIG. 3 are processes performed by the device information acquisition section 311.

The group setting section 312 refers to the information stored in the device/group information storage section 313, to create a group including multiple devices in response to a request from the smart home application 2A. Further, the group setting section 312 performs addition/deletion of a device configuring the group, in response to a request from the smart home application 2A. The group setting section 312 causes the device/group information storage section 313 to store group information including the device ID of the device configuring the group. In a case where the setting of the group is updated, the group setting section 312 suitably transmits a group update notification to the device.

For example, the processes in steps S15, S16, S17, and S18 in FIG. 3 are processes performed by the group setting section 312. Further, the processes in steps S63, S64, S65, and S66 in FIG. 8 are processes performed by the group setting section 312. The processes in steps S113, S114, S115, and S116 in FIG. 9 are processes performed by the group setting section 312.

In a case where setting of a group is automatically performed according to a result of recognition of a context, the group setting section 312 also performs a process for changing a device configuring the group and so forth according to a result of recognition supplied from the context recognition section 315.

The device/group information storage section 313 stores device information, device state information, Capability information, and group information, in an associated relation with the account information of the user. The information stored in the device/group information storage section 313 is read out suitably by the group setting section 312 and the command generation section 314. Further, the information stored in the device/group information storage section 313 is provided to the smart home application 2A.

The command generation section 314 refers to the information stored in the device/group information storage section 313, to specify a device to be made an operation target in response to a request from the smart home application 2A. The command generation section 314 generates and transmits a group controlling command or a single piece controlling command to the device of the operation target. The command generation section 314 also performs a process for transmitting the group controlling command or the single controlling command according to a result of recognition of the context and so forth.

For example, the processes in steps S211 and S212 in FIG. 12 are processes performed by the command generation section 314.

The context recognition section 315 acquires sensor data transmitted thereto from the sensors, the smartphone 2, and the devices. The context recognition section 315 recognizes a context including a state of the user, a state of the devices, a state of the space, and so forth in reference to the sensor data. The context recognition section 315 outputs information representative of a result of the recognition of the context to the group setting section 312 and the command generation section 314.

<Configuration of Smartphone 2>

Figure 27:
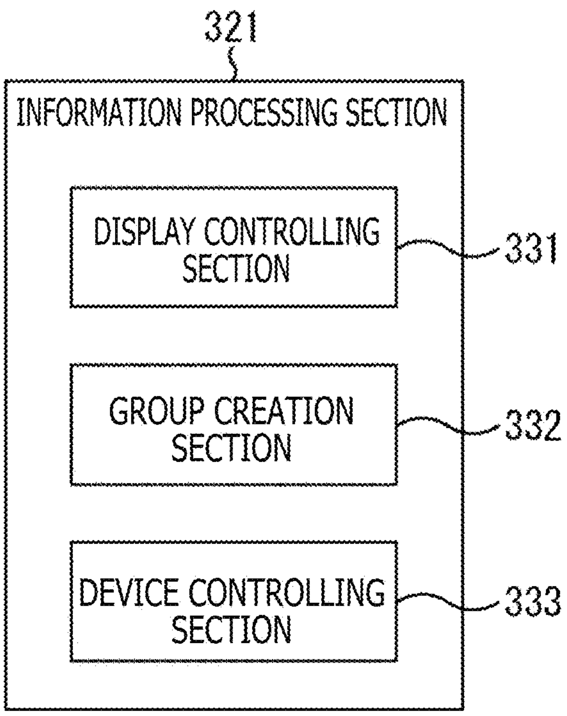
FIG. 27 is a block diagram depicting an example of a functional configuration of a smartphone.

FIG. 27 is a block diagram depicting an example of a functional configuration of the smartphone 2.

As depicted in FIG. 27, an information processing section 321 is implemented in the smartphone 2. The information processing section 321 includes a display controlling section 331, a group creation section 332, and a device controlling section 333. The configuration depicted in FIG. 27 is implemented by the smart home application 2A executed by the CPU of the computer configuring the smartphone 2.

The display controlling section 331 controls display of a screen of the smart home application 2A according to operation performed by the user. The display of the screen of the smart home application 2A is performed suitably in reference to information acquired from the device management server 1. The display controlling section 331 causes the screen of the smart home application 2A to be displayed on the display of the smartphone 2, by using the information acquired from the device management server 1 or the like.

For example, the processes in steps S1, S5, and S8 in FIG. 3 are processes performed by the display controlling section 331. Further, the process in step S56 in FIG. 8 and the process in step S107 in FIG. 9 are processes performed by the display controlling section 331.

The group creation section 332 accepts operation performed by the user in relation to creation of a group and addition/deletion of a device configuring a group, and transmits information representative of contents of the operation performed by the user to the device management server 1.

For example, the processes in steps S6 and S7 in FIG. 3 are processes performed by the group creation section 332. Further, the processes in steps S53, S54, and S55 in FIG. 8 and the processes in steps S103, S104, and S105 in FIG. 9 are processes performed by the group creation section 332.

The device controlling section 333 transmits the information representative of contents of the operation performed by the user to the device management server 1 and issues a request for collectively controlling the devices configuring a group or a request for controlling a device as a single piece. Further, the device controlling section 333 performs communication with a network-compatible device or a BT device, to control the device.

For example, the process in step S2 in FIG. 3, the process in step S106 in FIG. 9, and the process in step S201 in FIG. 12 are performed by the device controlling section 333.

<Configuration of Device>

Figure 28:
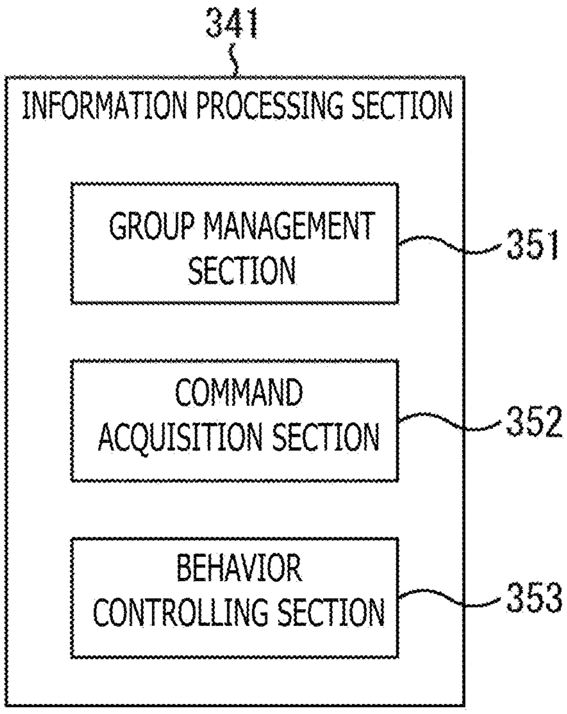
FIG. 28 is a block diagram depicting an example of a functional configuration of a device.

FIG. 28 is a block diagram depicting an example of a functional configuration of a device.

As depicted in FIG. 28, an information processing section 341 is implemented in each of the devices to be made an operation target. The information processing section 341 includes a group management section 351, a command acquisition section 352, and a behavior controlling section 353. The configuration depicted in FIG. 28 is implemented by a predetermined program executed by a CPU of a computer incorporated in the device.

The group management section 351 receives a group update notification transmitted thereto from the device management server 1 and sets a group to which a device is to belong.

For example, the process in step S23 in FIG. 3, the processes in steps S71 and S81 in FIG. 8, and the processes in steps S121 and S131 in FIG. 9 are processes performed by the group management section 351.

The command acquisition section 352 receives a control command transmitted thereto from the device management server 1 or the smart home application 2A. The control command received by the command acquisition section 352 is outputted to the behavior controlling section 353.

The processes in steps S221 and S231 in FIG. 12 are processes performed by the command acquisition section 352.

The behavior controlling section 353 executes the control command to control the components of the device. A behavior according to the control command is performed by control of the behavior controlling section 353.

Modification

The devices configuring a group may be automatically changed according to a period of a time zone, days of week, or days.

The smart home application 2A may be used to perform operation of not a device installed in the house of the user but a device installed in any space such as a device in an office, a device in a shop, or a device in a public facility.

Example of Configuration of Computer

While the series of processes described above can be executed by hardware, it may otherwise be executed by software. In a case where the series of processes is executed by software, a program that constructs the software is installed into a computer incorporated in hardware for exclusive use, a personal computer for universal use, or the like from a program recording medium.

Figure 29:
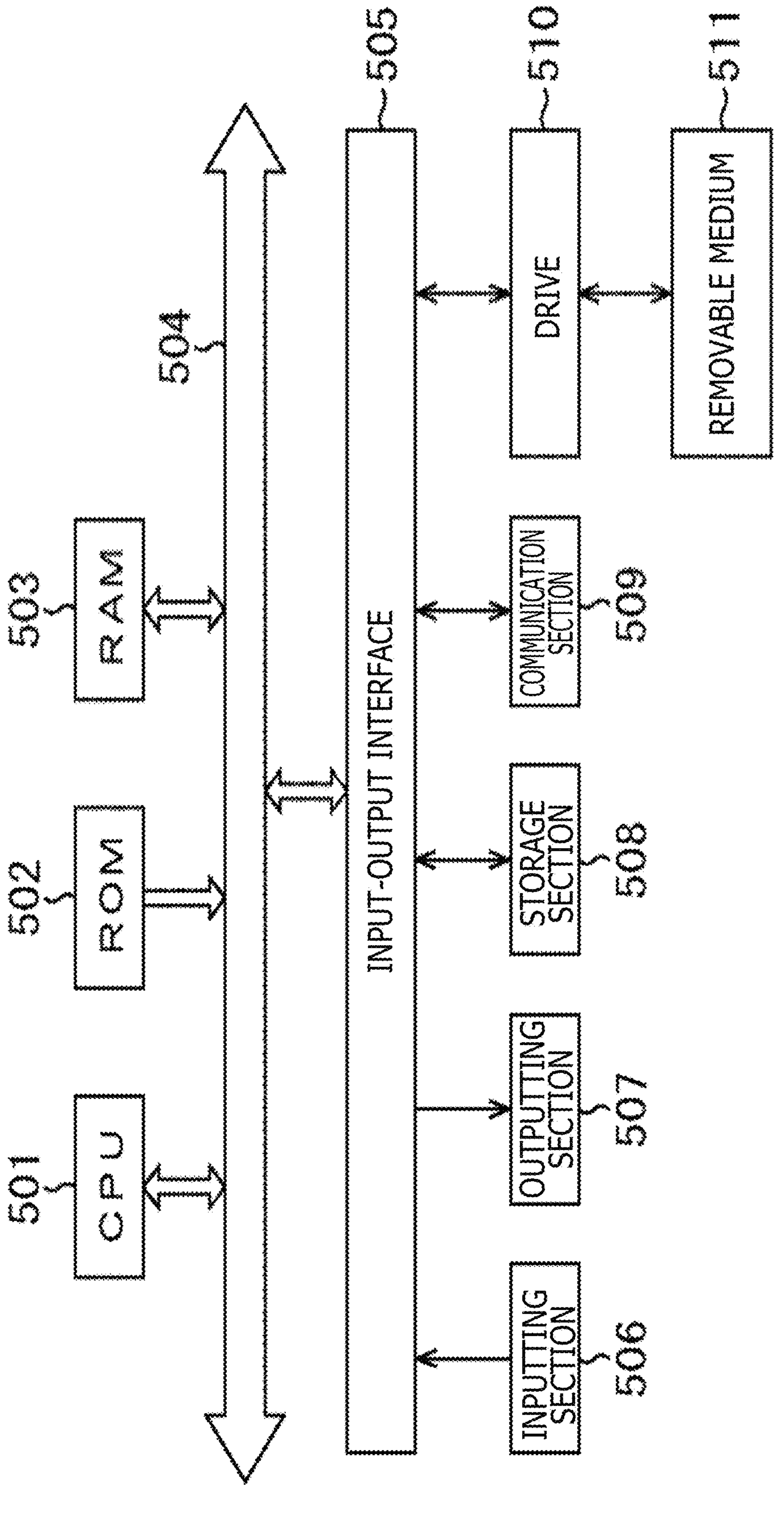
FIG. 29 is a view depicting an example of a hardware configuration of a computer.

FIG. 29 is a block diagram depicting an example of a hardware configuration of a computer that executes the series of processes described hereinabove, in accordance with a program.

The device management server 1 and the smartphone 2 including a computer having such a configuration as depicted in FIG. 29.

A CPU (Central Processing Unit) 501, a ROM (Read Only Memory) 502, and a RAM (Random Access Memory) 503 are connected to one another by a bus 504.

Further, an input/output interface 505 is connected to the bus 504. An inputting section 506 including a keyboard, a mouse, and so forth and an outputting section 507 including a display, a speaker, and so forth are connected to the input/output interface 505. Further, a storage section 508 including a hard disk, a nonvolatile memory, or the like, a communication section 509 including a network interface or the like, and a drive 510 for driving a removable medium 511 are connected to the input/output interface 505.

In the computer configured in such a manner as described above, the CPU 501 loads a program recorded, for example, in the storage section 508 into the RAM 503 via the input/output interface 505 and the bus 504 and executes the program to carry out the series of processes described above.

The program to be executed by the CPU 501 is, for example, recorded on and provided as the removable medium 511 or is provided through a wired or wireless transmission medium such as a local area network, the Internet, or a digital broadcast, and is installed into the storage section 508.

The program to be executed by the computer may be a program in which processing is performed in a time series in the order as described in the present specification or may be a program in which processes are performed in parallel or each performed at a necessary timing when it is called or the like.

In the present specification, the term system signifies a set of multiple components (devices, modules (parts) or the like), and it does not matter whether or not all components are housed in the same housing. Accordingly, both multiple devices that are accommodated in different housings and are connected to each other by a network and a single apparatus in which multiple modules are accommodated in one housing are systems.

The advantageous effects described in the present specification are exemplary to the end and are not restrictive, and other advantageous effects may be available.

The embodiment of the present technology is not limited to the embodiment described hereinabove and can be altered in various manners without departing from the subject matter of the present technology.

For example, the present technology can assume a configuration for cloud computing in which one function is shared and cooperatively processed by multiple devices through a network.

Further, the steps described with reference to the flow charts described hereinabove can not only be executed by a single device but also be shared and executed by multiple devices.

Furthermore, in a case where one step includes multiple processes, the multiple processes included in the one step can not only be executed by one device but also be shared and executed by multiple devices.

Example of Combination of Configurations

The present technology can also assume such configurations as described below.

(1)

An information processing terminal including:

a display controlling section that causes a selection screen for an operation target to be displayed, the selection screen including information concerning a group including multiple devices selected from among devices registered in a server and information concerning one of the devices as a single piece that does not belong to the group; and a control section that requests the server to collectively control the devices configuring the group and requests the server to control one of the devices as a single piece, according to a selected operation target.

(2)

The information processing terminal according to (1) above, in which the display controlling section causes, in a case where the group is selected to be the operation target, a first operation screen that is used for operation of the group, to be displayed but causes, in a case where one of the devices as a single piece is selected to be the operation target, a second operation screen that is used for operation of one of the devices as a single piece, to be displayed.

(3)

The information processing terminal according to (2) above, in which the display controlling section causes the first operation screen of different contents according to the devices configuring the group.

(4)

The information processing terminal according to any one of (1) through (3) above, further including:

a group creation section that creates the group in response to the multiple devices configuring the group and a name to be set for the group being selected by a user.

(5)

The information processing terminal according to (4) above, in which the group creation section transmits information representing request for creation of the group or information representing request for change of the devices configuring the group to the server.

(6)

The information processing terminal according to (4) or (5) above, in which the group creation section adds one of the devices selected from among the devices each as a single piece that does not belong to the group, as the device configuring the group.

(7)

The information processing terminal according to any one of (4) through (6), in which, in a case where operation for creating the group is performed in a state in which one of the devices as a single piece that does not belong to the group is selected, the group creation section newly creates the group including the selected device.

(8)

The information processing terminal according to any one of (4) through (7) above, in which the group creation section changes one of the devices configuring the group to a different one of the devices that does not belong to the group, according to operation performed by the user.

(9)

The information processing terminal according to any one of (1) through (3) above, in which the devices configuring the group are changed by the server according to a result of recognition of a context based on sensor data.

(10)

The information processing terminal according to (9) above, in which the server recognizes at least one of a state of a user and a state of the devices, as the context.

(11)

An information processing method performed by an information processing apparatus, including:

displaying a selection screen for an operation target including information concerning a group including in a server and information concerning one of the devices as a single piece that does not belong to the group; and requesting the server to collectively control the devices configuring the group and requesting the server to control one of the devices as a single piece, according to a selected operation target.

(12)

A program for causing a computer to execute processes for:

causing a selection screen for an operation target to be displayed, the selection screen including information concerning a group including multiple devices selected from among devices registered in a server and information concerning one of the devices as a single piece that does not belong to the group; and requesting the server to collectively control the devices configuring the group and requesting the server to control one of the devices as a single piece, according to a selected operation target.

REFERENCE SIGNS LIST

1: Device management server
2: Smartphone
21: TV
22: Soundbar
23, 24: Speaker
25: Headphone
31-1 to 31-4: Speaker
32-1, 32-2: Speaker
201: Information processing section
311: Device information acquisition section
312: Group setting section
313: Device/group information storage section
314: Command generation section
315: Context recognition section
321: Information processing section
331: Display controlling section
332: Group creation section
333: Device controlling section
341: Information processing section
351: Group management section
352: Command acquisition section
353: Behavior controlling section

The invention claimed is:

1. An information processing terminal comprising circuitry configured to:

cause a selection screen for an operation target to be displayed, the selection screen including information concerning a group including multiple devices selected from among devices registered in a server and information concerning another device of the registered devices that does not belong to any group;

request the server to collectively control the multiple devices configuring the group and request the server to control the another device that does not belong to any group according to a selected operation target; and in a case where the group is selected to be the operation target, cause a first operation screen that is used for operation of the group, to be displayed and in a case where the another device that does not belong to any group is selected to be the operation target, cause a second operation screen that is used for operation of the another device that does not belong to any group, to be displayed.

2. The information processing terminal according to claim 1, wherein the first operation screen and the second operation screen have different layouts.

3. The information processing terminal according to claim 2, wherein the circuitry is further configured to cause the first operation screen to have different contents according to the multiple devices configuring the group.

4. The information processing terminal according to claim 1, wherein the circuitry is further configured to create the group in response to the multiple devices configuring the group and a name to be set for the group being selected by a user.

5. The information processing terminal according to claim 4, wherein the circuitry is further configured to transmit information representing request for creation of the group or information representing request for change of the multiple devices configuring the group to the server.

6. The information processing terminal according to claim 4, wherein the circuitry is further configured to add some other device of the registered devices that does not belong to any group, as the multiple devices configuring the group.

7. The information processing terminal according to claim 4, wherein, in a case where the operation for creating the group is performed in a state in which some other device of the registered devices that does not belong to any group is selected, the circuitry is further configured to newly create the group including the selected device.

8. The information processing terminal according to claim 4, wherein the circuitry is further configured to change one of the registered devices configuring the group to a different one of the registered devices that does not belong to the group, according to an operation which is performed by the user.

9. The information processing terminal according to claim 1, wherein the multiple devices configuring the group are changed by the server according to a result of recognition of a context based on sensor data.

10. The information processing terminal according to claim 9, wherein the server recognizes at least one of a state of a user and a state of the multiple devices, as the context.

11. An information processing method performed by an information processing apparatus, comprising:

displaying a selection screen for an operation target including information concerning a group including multiple devices selected from among devices registered in a server system and information concerning one of the registered devices that does not belong to the group;

requesting the server system to collectively control the multiple devices configuring the group and requesting the server system to control the one of the registered devices that does not belong to the group according to a selected operation target; and in a case where the group is selected to be the operation target, causing a first operation screen that is used for operation of the group, to be displayed and in a case where the one of the registered devices that does not belong to the group is selected as the operation target, causing a second operation screen that is used for operation of the one of the registered devices that does not belong to the group, to be displayed, wherein the information processing apparatus operates in coordination with the server system such that the server system stores group information associating the multiple devices with the group and performs the collective control in response to the request.

12. The information processing method according to claim 11, wherein the first operation screen and the second operation screen have different layouts.

13. The information processing method according to claim 12, wherein the first operation screen has different contents according to the multiple devices configuring the group.

14. The information processing method according to claim 12, further comprises:

creating the group in response to the multiple devices configuring the group and a name to be set for the group being selected by a user.

15. The information processing method according to claim 14, further comprises:

transmitting information representing request for creation of the group or information representing request for change of the multiple devices configuring the group to the server system.

16. The information processing method according to claim 14, further comprises:

adding some other device of the registered devices that does not belong to the group, as the multiple devices configuring the group.

17. The information processing method according to claim 14, further comprises:

in a case where the operation for creating the group is performed in a state in which some other device of the registered devices that does not belong to the group is selected, newly creating the group including the selected device.

18. The information processing method according to claim 14, further comprises:

changing one of the registered devices configuring the group to a different one of the registered devices that does not belong to the group, according to an operation which is performed by the user.

19. An information processing system comprising a computer configured to:

cause a selection screen for an operation target to be displayed, the selection screen including information concerning a group including multiple devices selected from among devices registered in a server system and information concerning one of the registered devices that does not belong to the group;

cause the server system to collectively control the multiple devices configuring the group and request the server system to control the one of the registered devices that does not belong to the group according to a selected operation target; and in a case where the group is selected to be the operation target, cause a first operation screen that is used for operation of the group, to be displayed and in a case where the one of the registered devices that does not belong to the group is selected as the operation target, cause a second operation screen that is used for operation of the one of the registered devices that does not belong to the group, to be displayed, wherein the computer operates in coordination with the server system such that the server system stores group information associating the multiple devices with the group and performs the collective control of the multiple devices in response to the request from the computer.

20. The information processing system according to claim 19, wherein the first operation screen and the second operation screen have different layouts.

* * * * *